(12) United States Patent
Nakahara et al.

(10) Patent No.: US 12,372,764 B2
(45) Date of Patent: Jul. 29, 2025

(54) ZOOM LENS AND IMAGE PICKUP APPARATUS HAVING THE SAME

(71) Applicant: CANON KABUSHIKI KAISHA, Tokyo (JP)

(72) Inventors: Makoto Nakahara, Tochigi (JP); Akira Mizuma, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 669 days.

(21) Appl. No.: 17/567,279

(22) Filed: Jan. 3, 2022

(65) Prior Publication Data
US 2022/0214530 A1 Jul. 7, 2022

(30) Foreign Application Priority Data

Jan. 7, 2021 (JP) .................................. 2021-001396

(51) Int. Cl.
*G02B 15/14* (2006.01)
*G02B 5/00* (2006.01)
(Continued)

(52) U.S. Cl.
CPC .. *G02B 15/145113* (2019.08); *G02B 13/0045* (2013.01); *G02B 13/02* (2013.01); *G02B 15/1461* (2019.08); *G02B 5/005* (2013.01)

(58) Field of Classification Search
CPC ........ G02B 15/145113; G02B 13/0045; G02B 13/02; G02B 15/1461; G02B 5/005;
(Continued)

(56) References Cited

U.S. PATENT DOCUMENTS 6,246,519 B1 *  6/2001  Suzuki ................. G02B 27/646
                                                            359/557
6,744,571 B2 *  6/2004  Ishii ............... G02B 15/144113
                                                            359/686
(Continued)

FOREIGN PATENT DOCUMENTS

JP          H08-62500 A       3/1996
JP        2005-043607 A       2/2005
(Continued)

OTHER PUBLICATIONS

Notification of Decision to Grant Patent Right issued by the China National Intellectual Property Administration on Oct. 31, 2023 in corresponding CN Patent Application No. 202210010795.9, with English translation.

*Primary Examiner* — Thomas K Pham
*Assistant Examiner* — Kuei-Jen L Edenfield
(74) *Attorney, Agent, or Firm* — Carter, DeLuca & Farrell LLP

(57) ABSTRACT

A zoom lens includes, in order from an object side to an image side, a first lens unit with a positive refractive power, a second lens unit with a negative refractive power, a third lens unit with a positive refractive power, and a fourth lens unit with a positive refractive power. During zooming from a wide-angle end to a telephoto end, the first lens unit moves, the second lens unit is fixed, a distance between the first lens unit and the second lens unit is widened, a distance between the second lens unit and the third lens unit is narrowed, and a distance between the third lens unit and the fourth lens unit is narrowed. The first lens unit includes a positive lens and a negative lens. Each of the second, third, and fourth lens units consists of two lenses or less.

20 Claims, 13 Drawing Sheets

(51) Int. Cl.
*G02B 13/00* (2006.01)
*G02B 13/02* (2006.01)

(58) Field of Classification Search
CPC ............ G02B 15/144113; G02B 15/14; G02B 13/00; G02B 5/00; G02B 27/646
USPC ........ 359/676–695, 745–795, 698, 714, 715, 359/728, 739
See application file for complete search history.

(56) References Cited

U.S. PATENT DOCUMENTS

| | | | |
|---|---|---|---|
| 7,764,438 B2* | 7/2010 | Kamo | G02B 15/144113 359/683 |
| 9,219,864 B2 | 12/2015 | Nakahara | |
| 9,377,606 B2 | 6/2016 | Nakahara | |
| 9,500,842 B2 | 11/2016 | Nakahara | |
| 10,268,104 B2 | 4/2019 | Nakahara | |
| 10,718,929 B2 | 7/2020 | Saito et al. | |
| 10,754,131 B2 | 8/2020 | Nakahara | |
| 10,935,755 B2 | 3/2021 | Saito et al. | |
| 2013/0093940 A1* | 4/2013 | Matsumura | G02B 15/145113 359/557 |
| 2013/0194465 A1* | 8/2013 | Kimura | G02B 15/173 359/687 |
| 2014/0139722 A1* | 5/2014 | Sugita | G02B 15/145113 359/684 |
| 2014/0184856 A1* | 7/2014 | Iwasawa | G02B 15/16 348/240.99 |
| 2014/0211029 A1* | 7/2014 | Okumura | G02B 15/145113 359/557 |
| 2019/0162940 A1 | 5/2019 | Nakahara | |
| 2021/0033835 A1 | 2/2021 | Nakahara | |
| 2021/0231931 A1 | 7/2021 | Mori et al. | |

FOREIGN PATENT DOCUMENTS

| | | |
|---|---|---|
| JP | 2007-298724 A | 11/2007 |
| JP | 2020-064176 A | 4/2020 |

\* cited by examiner

ZOOM LENS AND IMAGE PICKUP APPARATUS HAVING THE SAME

BACKGROUND OF THE INVENTION

Field of the Invention

The present invention relates to a zoom lens and an image pickup apparatus having the same, which is suitable for an image pickup apparatus using a solid-state image sensor such as a digital still camera, a video camera, a broadcasting camera, a surveillance camera, or a film-based camera.

Description of the Related Art

Recent zoom lenses used in image pickup apparatuses are demanded for high optical performance and a compact and lightweight structure. As a zoom lens that meets these demands, Japanese Patent Laid-Open No. 2005-43607 discloses a zoom lens having lenses with positive, negative, positive, and positive refractive powers in order from an object side to an image side, in which distances between adjacent lens units change during zooming.

Generally, in order to make small the zoom lens, it is effective to adopt a telephoto type power arrangement at a telephoto end to strengthen the positive refractive power on the object side and the negative refractive power on the image side. However, if the refractive power of each lens unit is increased, fluctuations of various aberrations associated with zooming become significant, and it becomes difficult to satisfactorily correct the various aberrations with a small number of lenses. It is therefore important to properly set each element in the zoom lens in order to obtain the high optical performance over the entire zoom range while reducing the size and weight of the entire zoom lens system. For example, it is important to properly set the number of lens units, a moving condition during zooming, a lens configuration of each lens unit, and the like.

SUMMARY OF THE INVENTION

The present invention provides a compact and lightweight zoom lens and image pickup apparatus having high optical performance over the entire zoom range.

A zoom lens according to one aspect of the present invention includes, in order from an object side to an image side, a first lens unit with a positive refractive power, a second lens unit with a negative refractive power, a third lens unit with a positive refractive power, and a fourth lens unit with a positive refractive power. During zooming from a wide-angle end to a telephoto end, the first lens unit moves, the second lens unit is fixed, a distance between the first lens unit and the second lens unit is widened, a distance between the second lens unit and the third lens unit is narrowed, and a distance between the third lens unit and the fourth lens unit is narrowed. The first lens unit includes a positive lens and a negative lens. The second lens unit consists of two lenses or less. The third lens unit consists of two lenses or less. The fourth lens unit consists of two lenses or less. An image pickup apparatus according to another aspect of the present invention includes the above zoom lens, and an image sensor configured to receive an image formed by the zoom lens.

Further features of the present invention will become apparent from the following description of exemplary embodiments with reference to the attached drawings.

DESCRIPTION OF THE EMBODIMENTS

Figure 1:
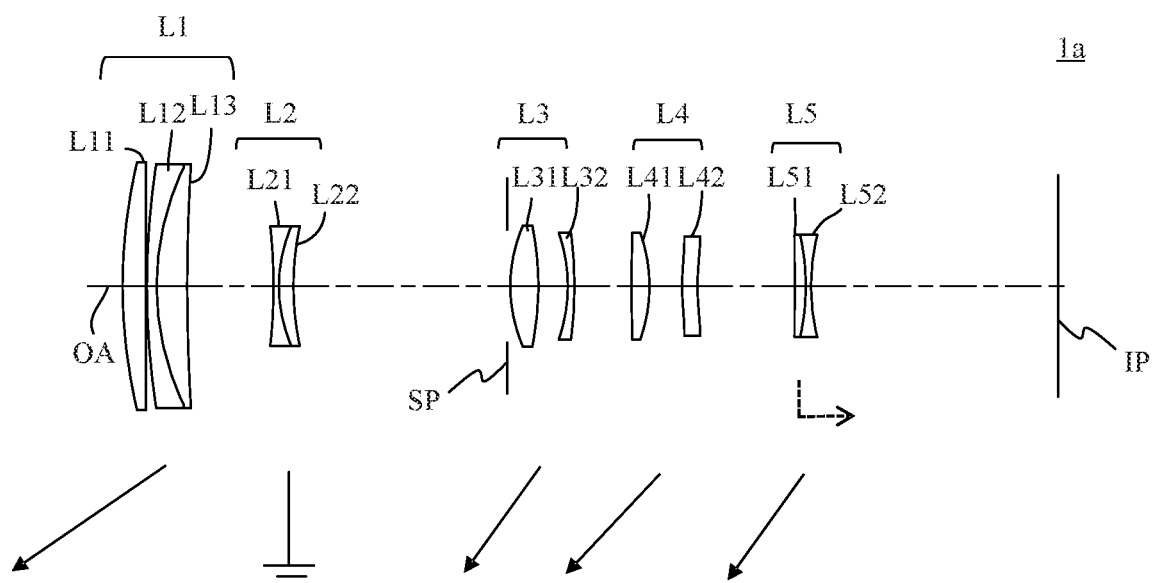
FIG. 1 is a sectional view of a zoom lens according to Example 1 at a wide-angle end.
Figure 2A:
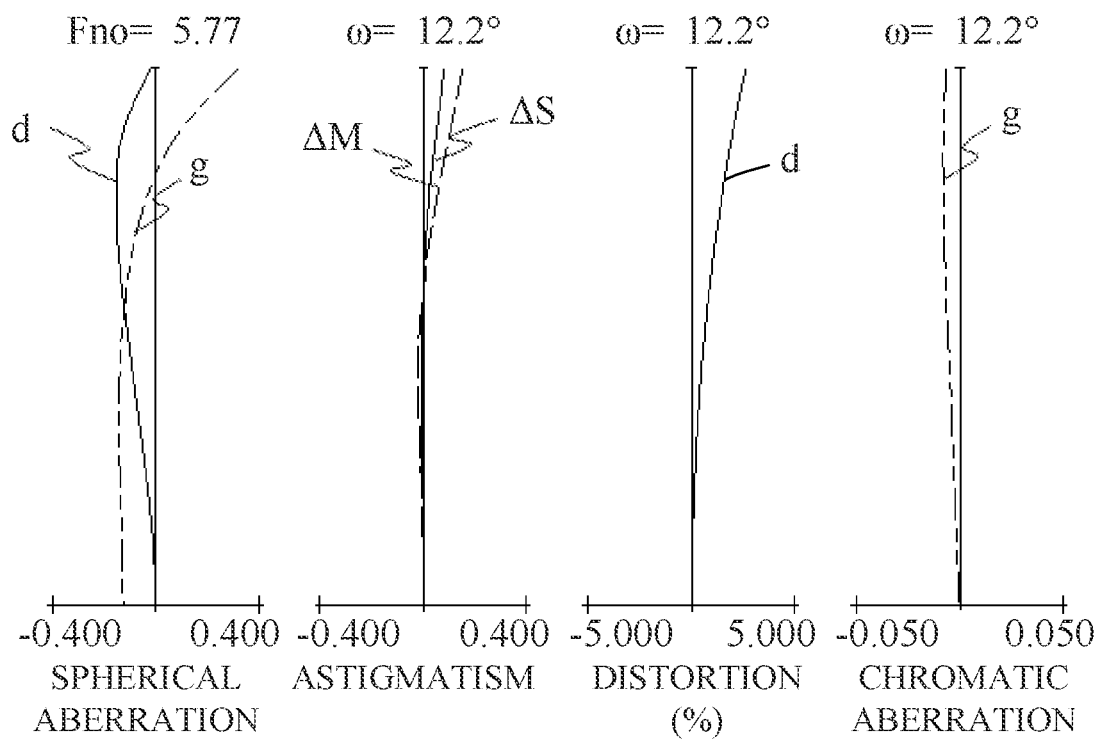
FIGS. 2A and 2B are longitudinal aberration diagrams at the wide-angle end and a telephoto end of the zoom lens according to Example 1.
Figure 2B:
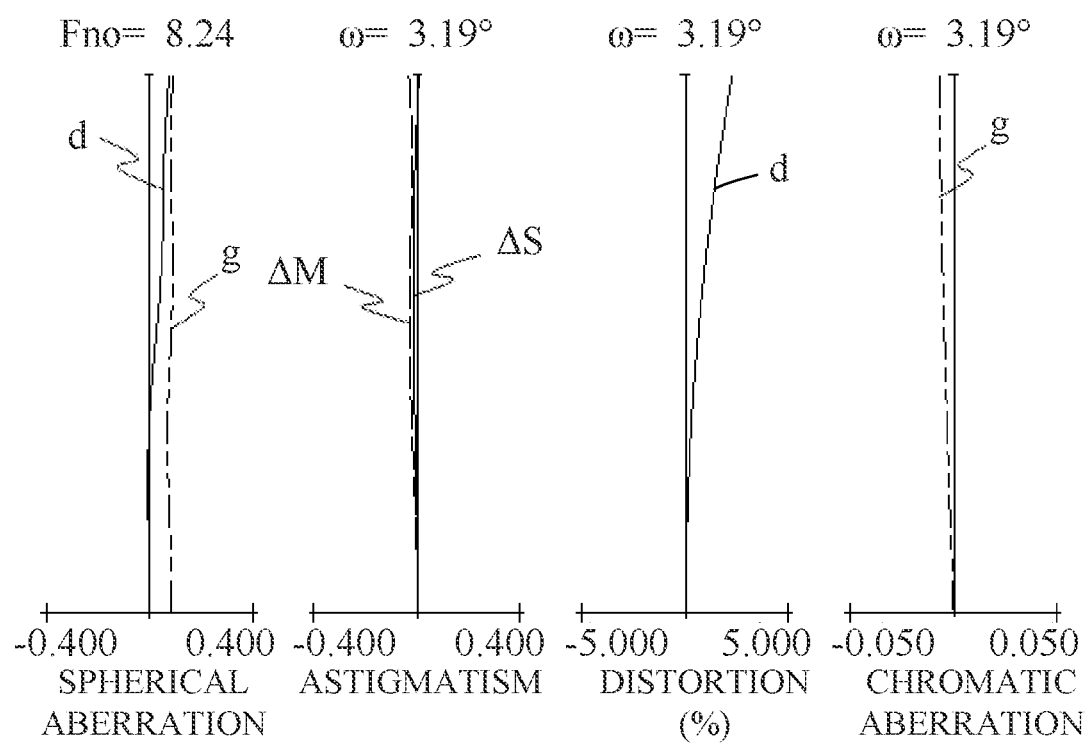
Figure 3:
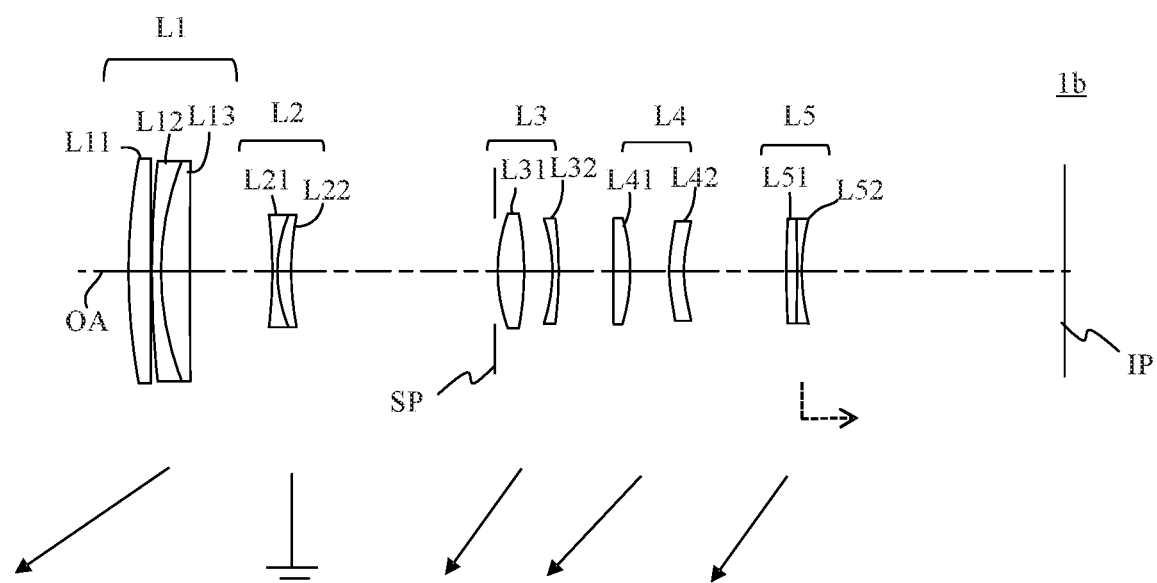
FIG. 3 is a sectional view of a zoom lens according to Example 2 at a wide-angle end.
Figure 4A:
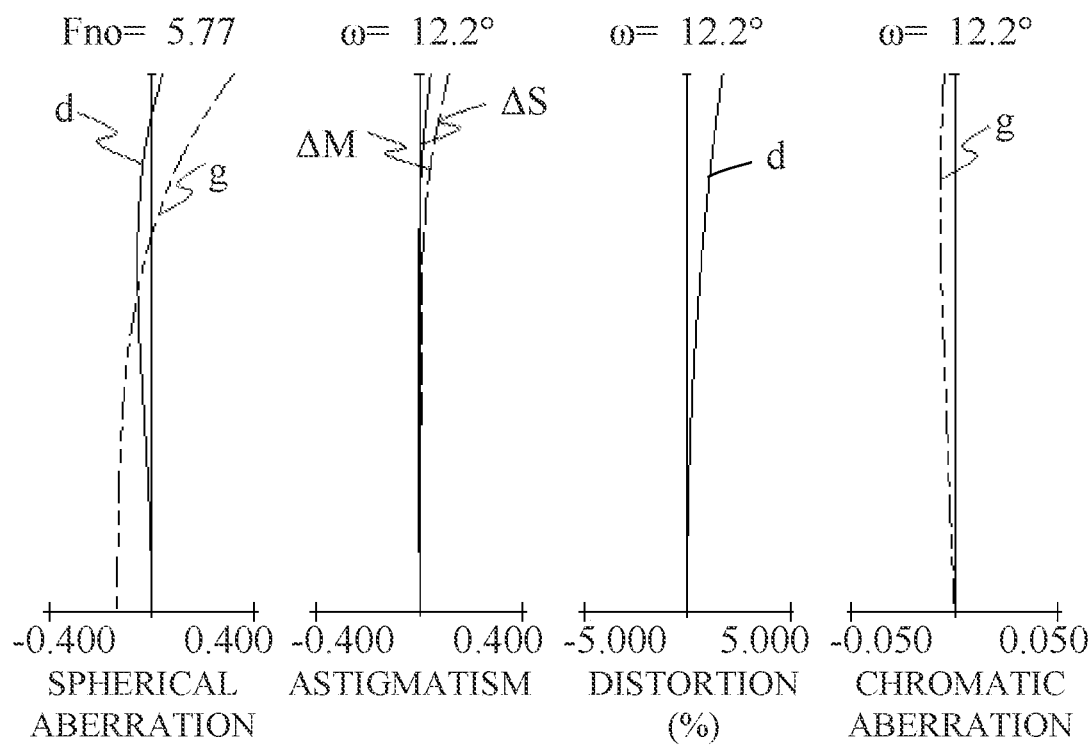
FIGS. 4A and 4B are longitudinal aberration diagrams at the wide-angle end and a telephoto end of the zoom lens according to Example 2.
Figure 4B:
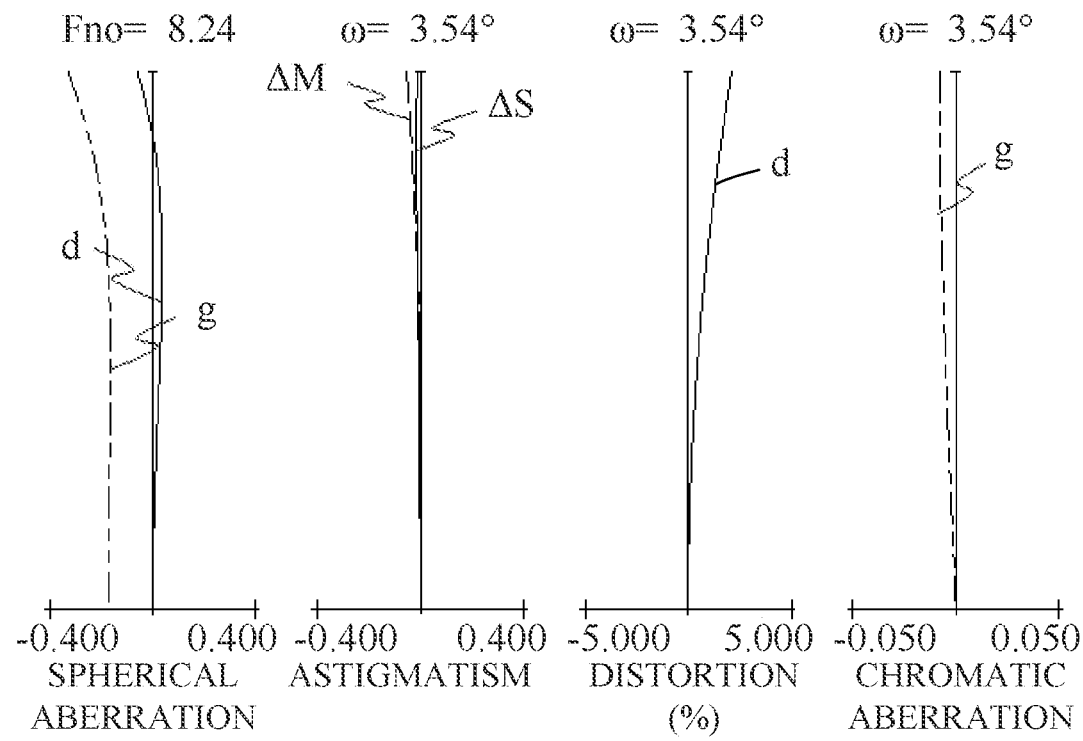
Figure 5:
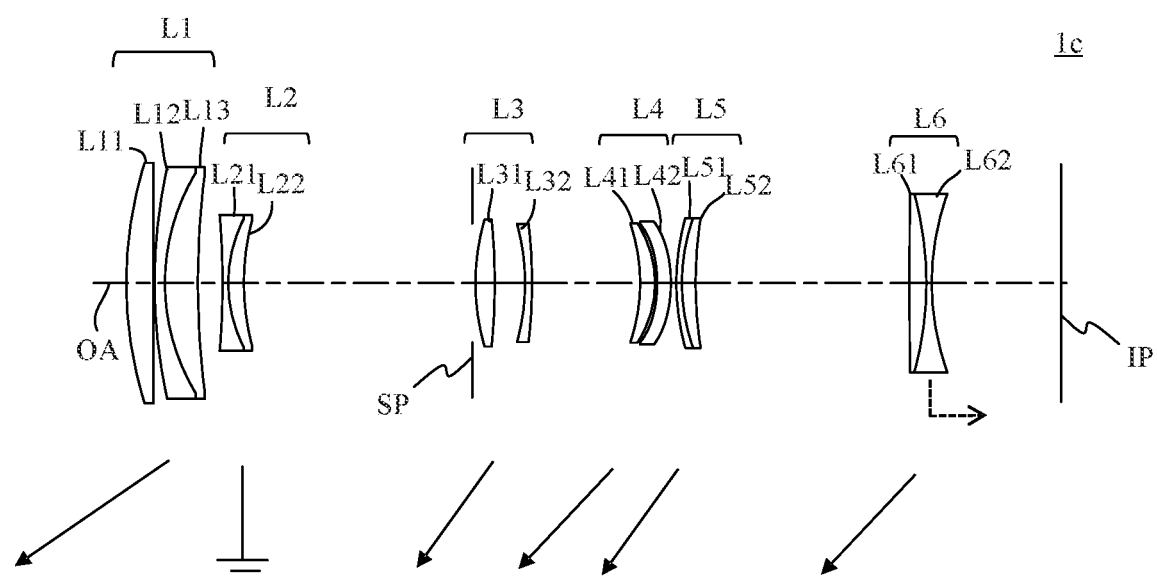
FIG. 5 is a sectional view of the zoom lens according to Example 3 at a wide-angle end.
Figure 6A:
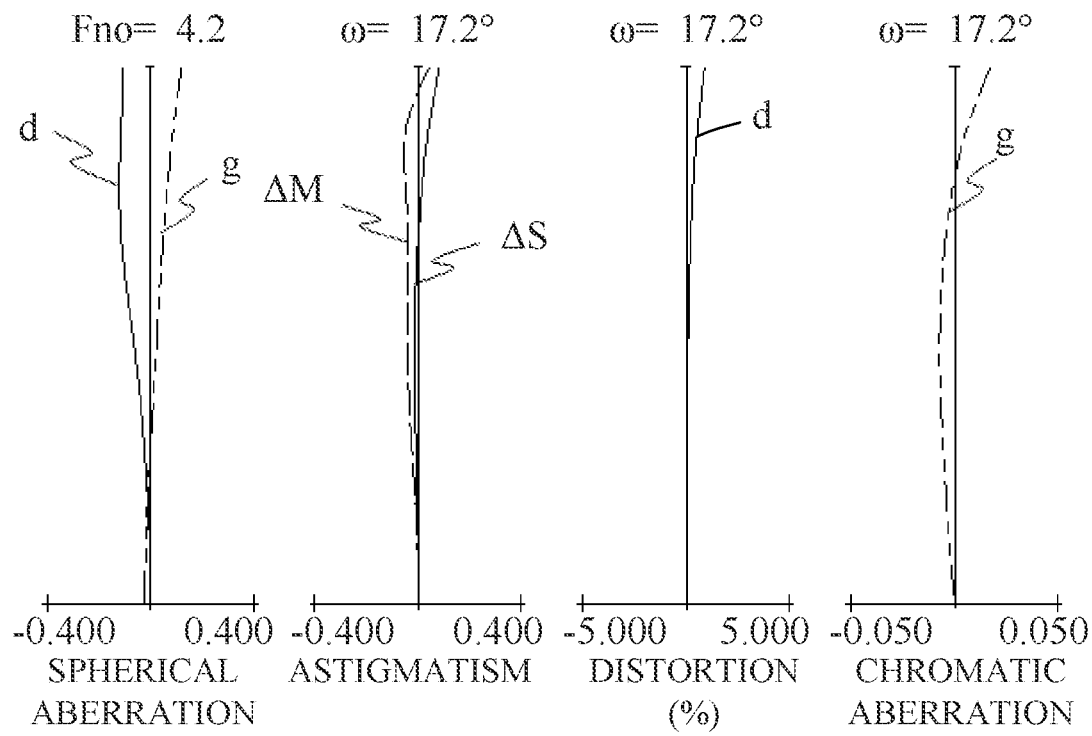
FIGS. 6A and 6B are longitudinal aberration diagrams at the wide-angle end and a telephoto end of the zoom lens according to Example 3.
Figure 6B:
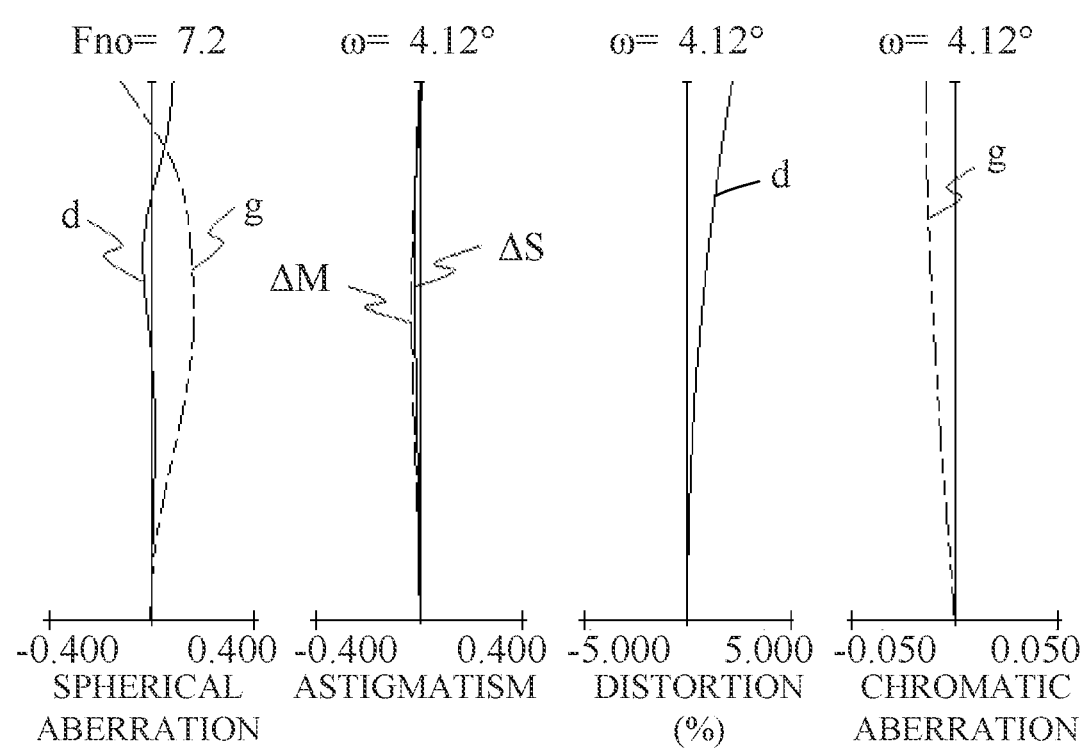
Figure 7:
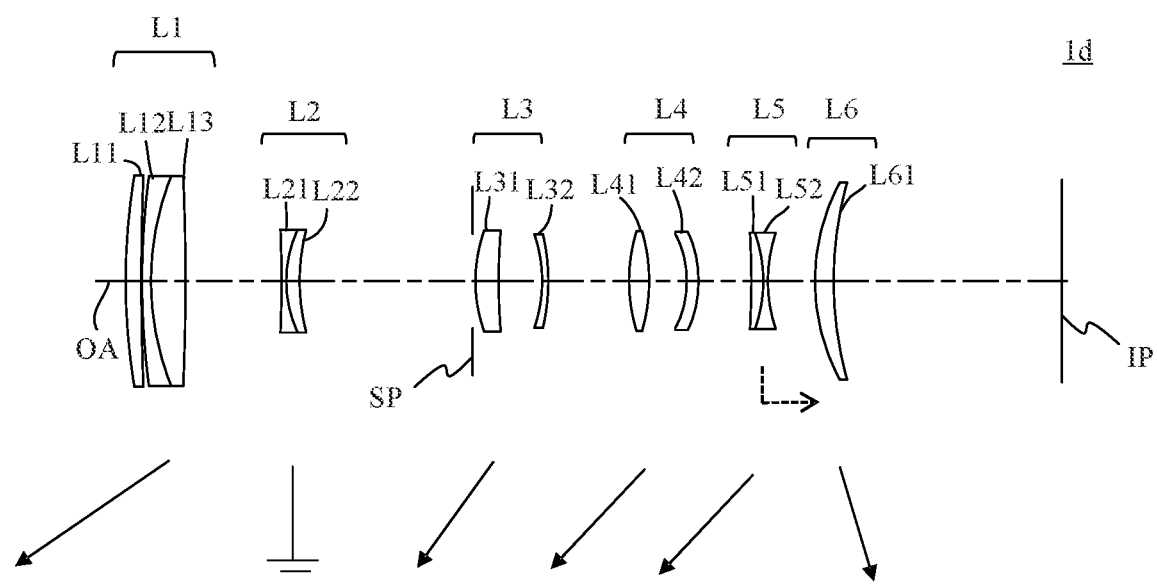
FIG. 7 is a sectional view of the zoom lens according to Example 4 at the wide-angle end.
Figure 8A:
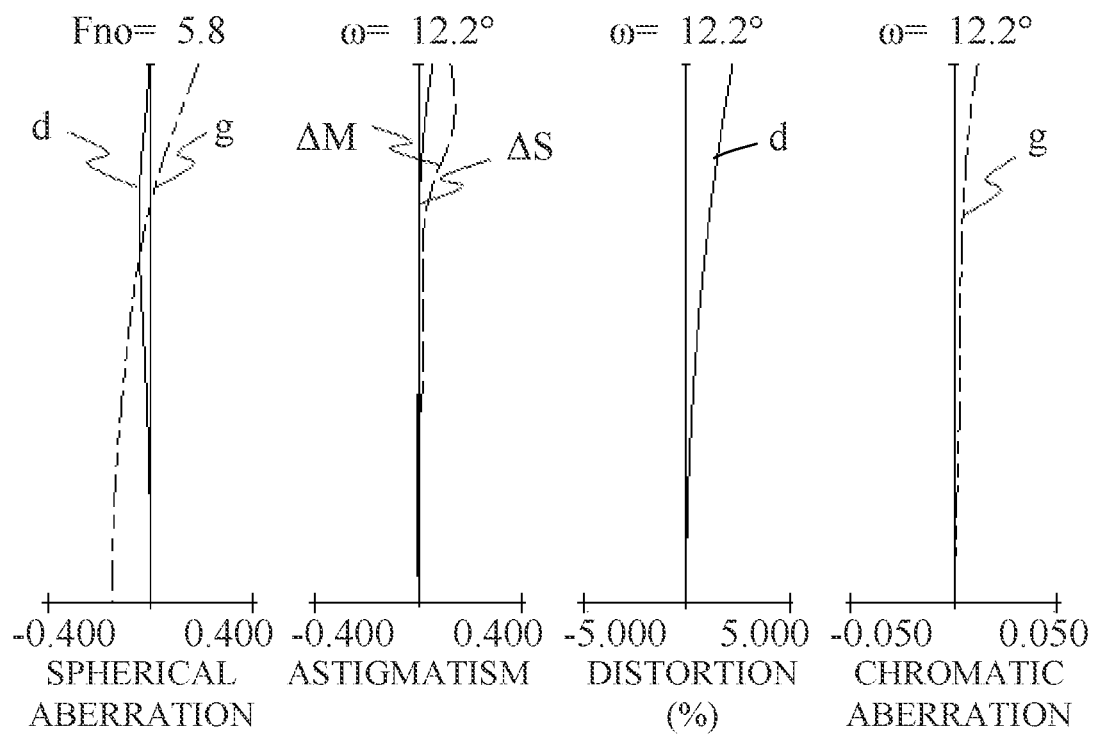
FIGS. 8A and 8B are longitudinal aberration diagrams at the wide-angle end and a telephoto end of the zoom lens according to Example 4.
Figure 8B:
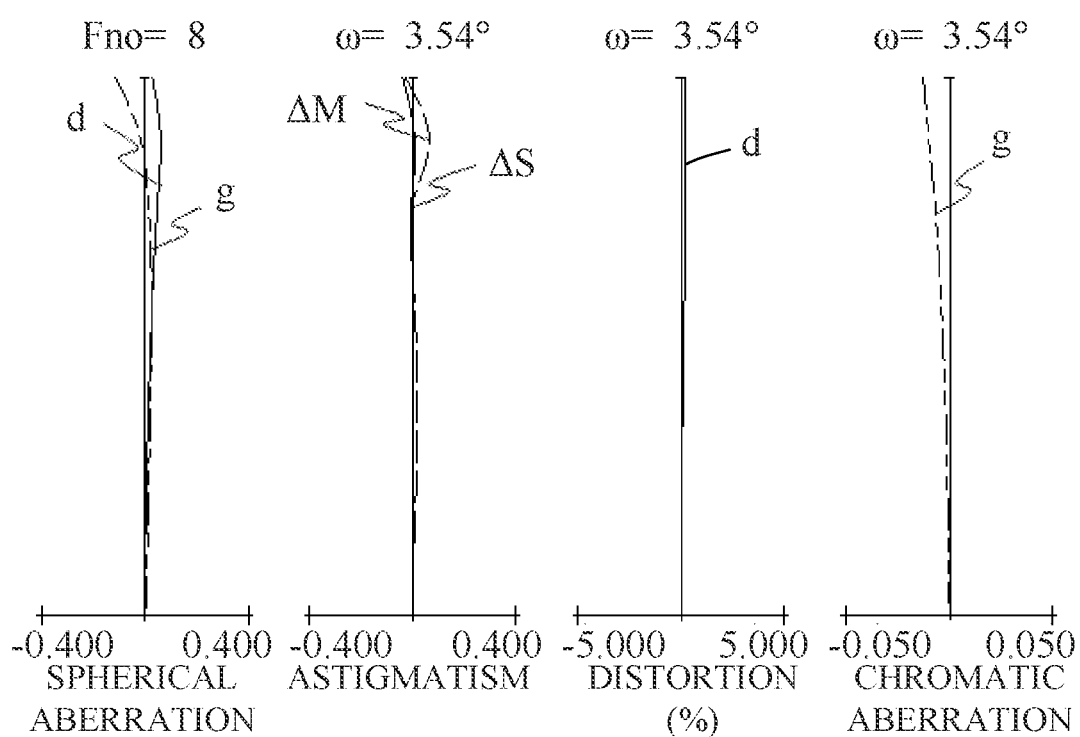
Figure 9:
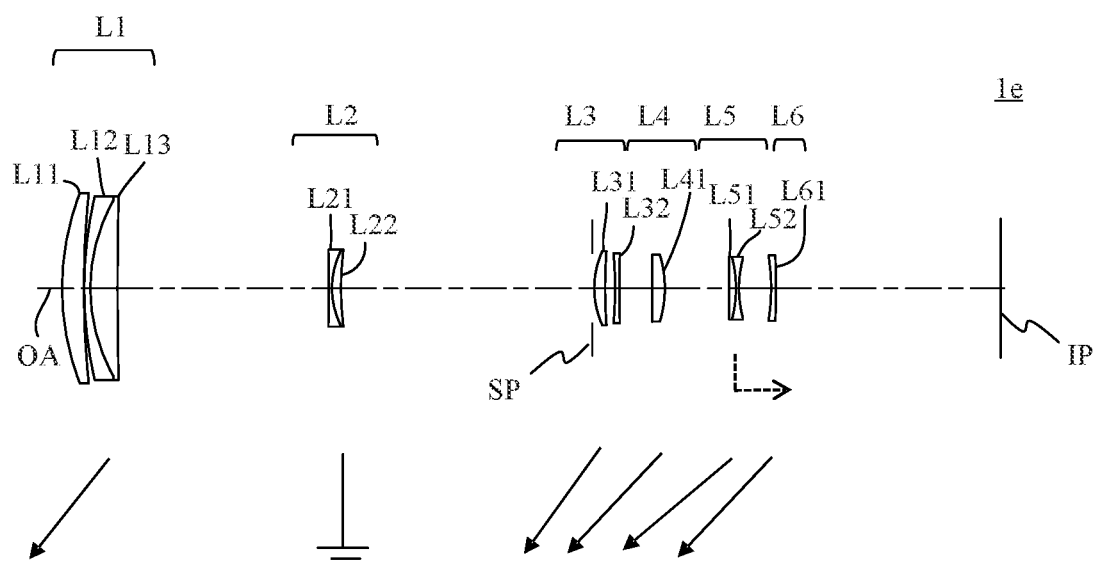
FIG. 9 is a sectional view of the zoom lens according to Example 5 at a wide-angle end.
Figure 10A:
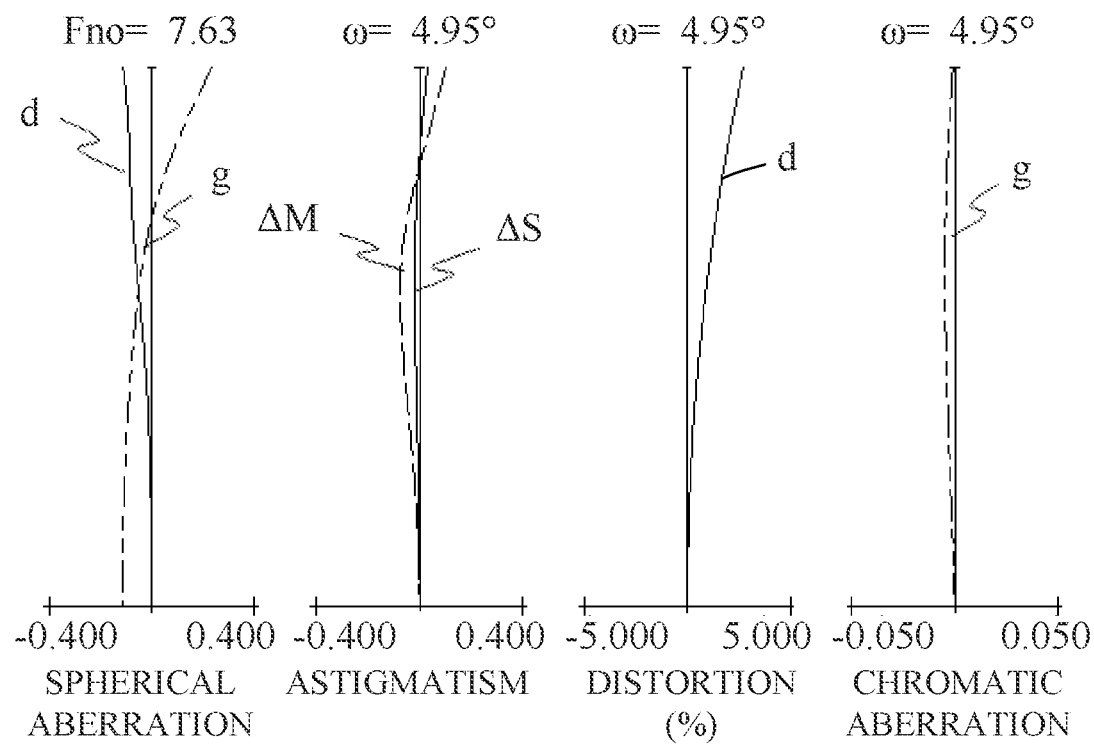
FIGS. 10A and 10B are longitudinal aberration diagrams at the wide-angle end and a telephoto end of the zoom lens according to Example 5.
Figure 10B:
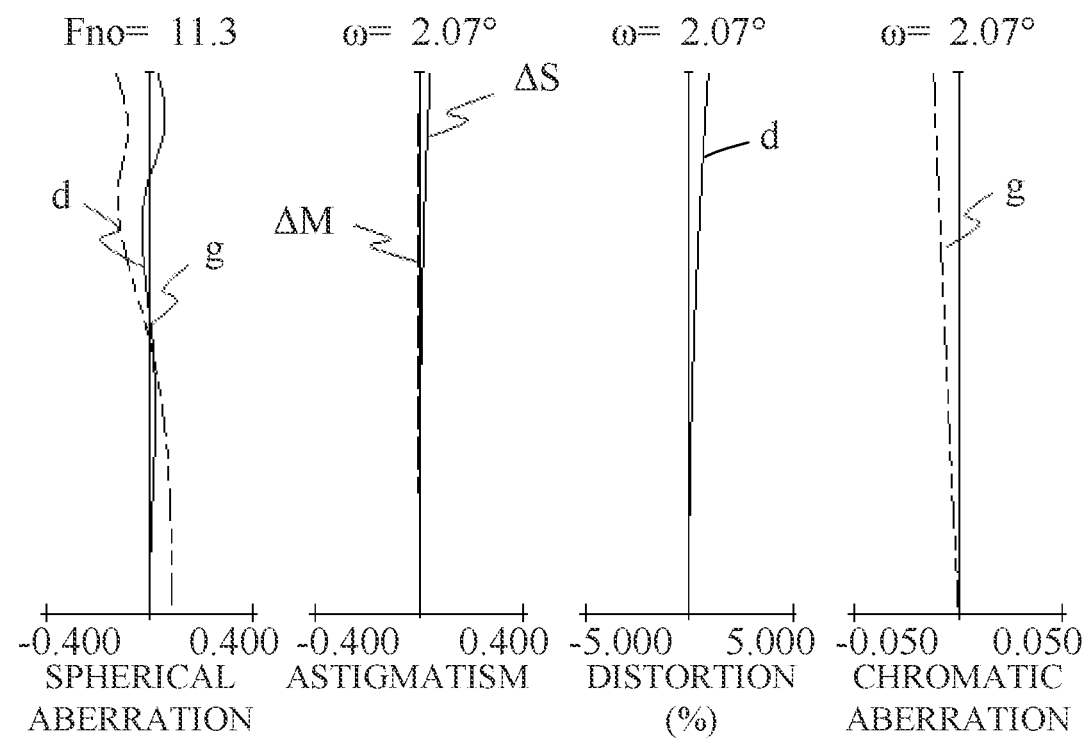
Figure 11:
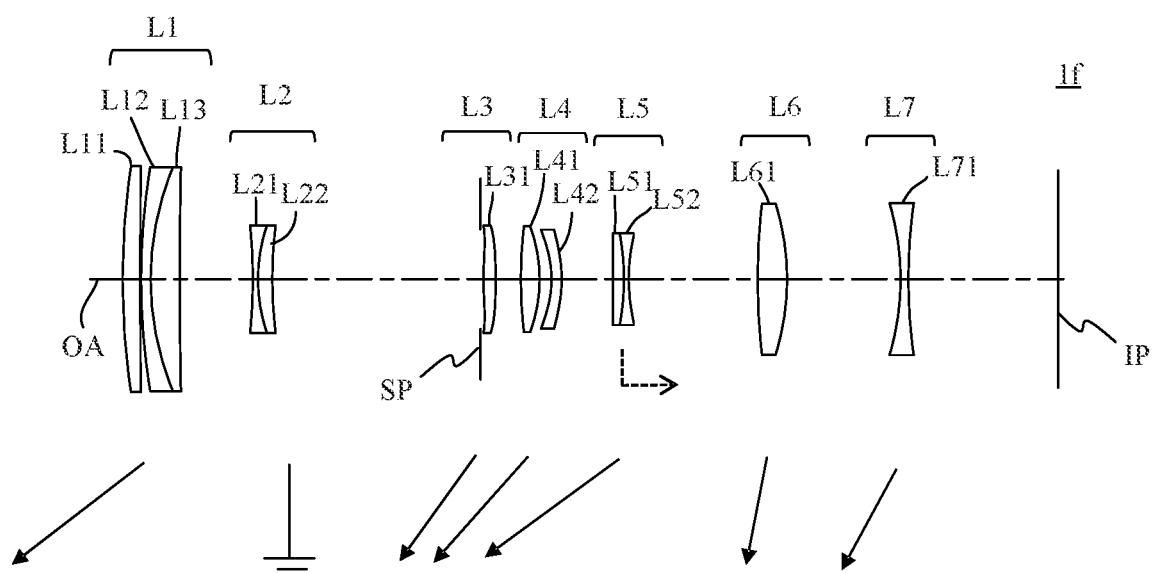
FIG. 11 is a sectional view of the zoom lens according to Example 6 at a wide-angle end.
Figure 12A:
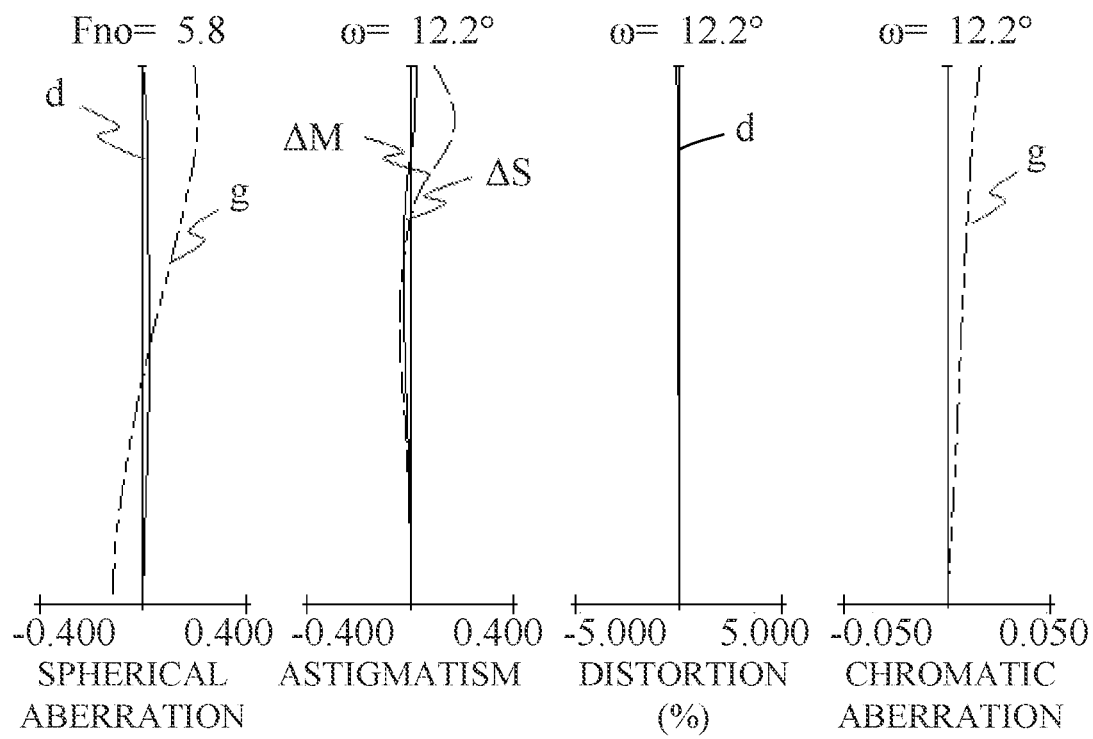
FIGS. 12A and 12B are longitudinal aberration diagrams at the wide-angle end and a telephoto end of the zoom lens according to Example 6.
Figure 12B:
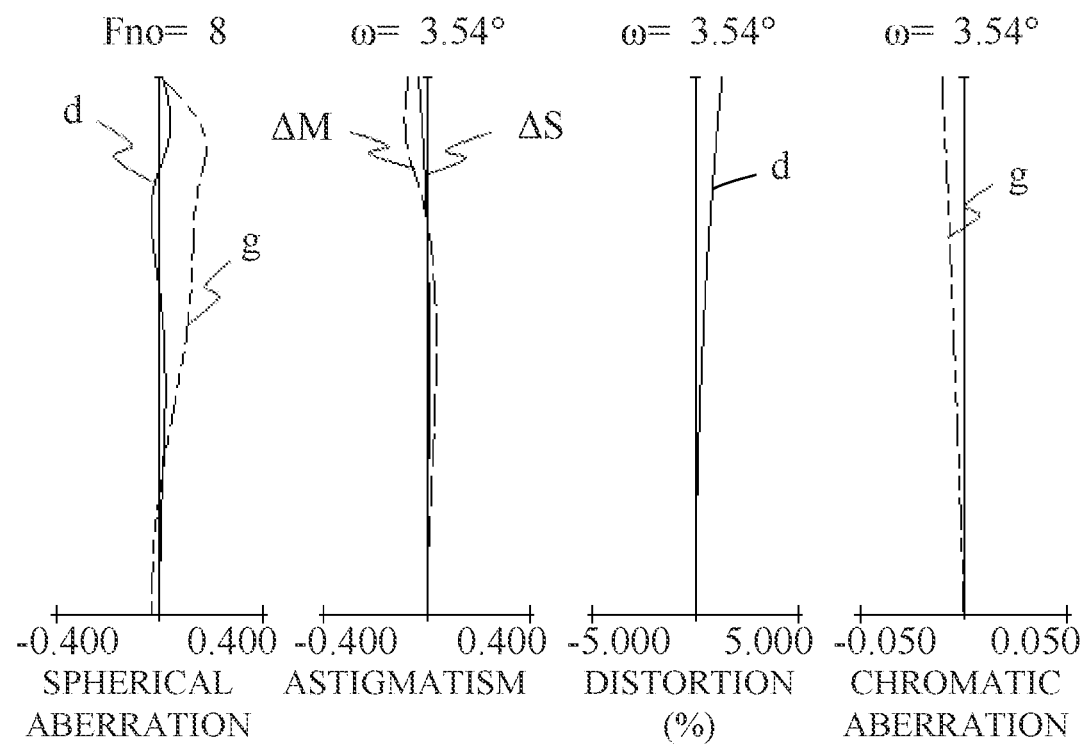

Referring now to the accompanying drawings, a detailed description will be given of embodiments according to the present invention.

FIGS. 1, 3, 5, 7, 9 and 11 are sectional views of zoom lenses (optical systems) 1a to 1f according to Examples 1 to 6, respectively, in in-focus states (infinity in-focus states) at infinity. The zoom lens according to each example is used for an optical apparatus including an image pickup apparatus such as a digital video camera, a digital still camera, a broadcasting camera, a film-based camera, a surveillance camera, and an interchangeable lens.

In each sectional view, a left side is an object side and a right side is an image side. The zoom lens according to each example includes a plurality of lens units. In each example, the lens unit is a group of lenses that move or are stationary integrally during zooming. In the zoom lens according to each example, distances between adjacent lens units change during zooming from a wide-angle end to a telephoto end. The wide-angle end and the telephoto end are zoom states when the lens unit that moves during zooming is mechanically located at both ends of a movable range in the direction along an optical axis OA (optical axis direction). Each lens unit may include one or more lenses. The lens unit may include a diaphragm (aperture stop).

In each sectional view, i (natural number) denotes the order counted from the object side, and Li denotes an i-th lens unit. SP denotes a diaphragm (aperture stop). IP denotes an image plane, and when the zoom lenses 1a to 1f according to respective examples are used for an imaging optical system for a digital video camera or a digital still camera, an imaging plane of a solid-state image pickup element (photoelectric conversion element) such as a CCD sensor or a CMOS sensor is disposed on the imaging plane IP. When the optical systems 1a to 1f according to respective examples are used for an imaging optical system for a film-based camera, a photosensitive surface of the film is disposed on the image plane IP.

In the zoom lenses 1a to 1f according to the respective examples, during zooming from the wide-angle end to the telephoto end, each lens unit is moved as shown by a solid arrow in each sectional view. During focusing from infinity to a close (or short distance) end, each lens unit is moved as indicated by a dotted arrow.

FIGS. 2A, 2B, 4A, 4B, 6A, 6B, 8A, 8B, 10A, 10B, 12A, and 12B are longitudinal aberration diagrams of the zoom lenses 1a to 1f according to Examples 1 to 6, respectively. In each aberration diagram, FIGS. 2A, 4A, 6A, 8A, 10A, and 12A are longitudinal aberration diagrams at the wide-angle end in the infinity in-focus state, and FIGS. 2B, 4B, 6B, 8B, 10B, and 12B are longitudinal aberration diagrams in the telephoto end in the infinity in-focus state.

In the spherical aberration diagrams, Fno denotes an F-number, and the spherical aberration diagram illustrates a spherical aberration amount for the d-line (wavelength 587.6 nm) and the g-line (wavelength 435.8 nm) by a solid line and an alternate long and two short dashes line, respectively. In the astigmatism diagram, ΔS denotes an astigmatism amount (solid line) on a sagittal image plane, and ΔM indicates an astigmatism amount (broken line) on a meridional image plane. The distortion diagram illustrates a distortion amount for the d-line. The chromatic aberration diagram illustrates a chromatic aberration for the g-line. ω is a half angle of view (°).

Next follows a description of the characteristic configurations and conditions of the zoom lens according to each example. The zoom lens according to each example includes, in order from the object side to the image side, a first lens unit L1 having a positive refractive power, a second lens unit L2 having a negative refractive power, a third lens unit L3 having a positive refractive power, and a fourth lens unit L4 having a positive refractive power. During zooming from the wide-angle end to the telephoto end, the first lens unit L1 moves, a distance between the first lens unit L1 and the second lens unit L2 is widened, a distance between the second lens unit L2 and the third lens unit L3 is narrowed, and a distance between the third lens unit L3 and the fourth lens unit L4 is narrowed. Thereby, it is configured to take a telephoto type power arrangement at the telephoto end, and the overall optical length (a distance from a surface closest to the object to the image plane IP) can be easily shortened. The negative second lens unit L2 does not move during zooming (fixed in the optical axis direction). Thereby, a relative eccentricity error between the first lens unit L1 and the second lens unit L2 is reduced, and a performance deterioration is reduced. In each example, the second lens unit L2 may be an image stabilization lens unit that can move in a direction intersecting the optical axis OA.

The first lens unit L1 includes a positive lens and a negative lens. Thereby, the chromatic aberration is suppressed during zooming from the wide-angle end to the telephoto end. The second lens unit L2 includes (consists of) two or less lenses. Thereby, the weight of the second lens unit L2 is reduced, and when the second lens unit L2 is used for the image stabilization lens unit, a driving mechanism can be easily made small. The third lens unit L3 and the fourth lens unit L4 each include (consists of) two or less lenses. Thereby, the weight of the lens unit that moves during zooming can be reduced, and quick zooming can be performed.

This configuration can provide a compact and lightweight zoom lens with high optical performance over the entire zoom range.

The zoom lenses 1a to 1f according to respective examples may have the following configurations. Since a moving amount of the fourth lens unit L4 becomes large during zooming from the wide-angle end to the telephoto end, the fourth lens unit L4 may include a lens having at least one aspherical surface in order to suppress fluctuations in various aberrations.

A lens unit having a negative refractive power may be disposed on the image side of the fourth lens unit L4. Thereby, the telephoto type power arrangement is adopted, and the overall optical length can be easily shortened. The lens on the image side of the fourth lens unit L4 may include four lenses or less. Thereby, the weight of the lens unit that moves during zooming can be reduced, and quick zooming can be performed.

The effective diameter of the luminous flux tends to be smaller in the lens unit on the image side of the diaphragm SP. Therefore, if the lens unit on the image side of the diaphragm SP is set to the focus lens unit, the holding mechanism and the driving mechanism can be simplified and the entire system can be easily made smaller. If the focus lens unit includes (consists of) two or less lenses, the weight of the focus lens unit can be easily reduced. Since the magnification varying effect is relatively smaller on the image side of the diaphragm SP, the image magnification change can be reduced during focusing from infinity to a close end. This point is particularly suitable for motion image capturing because changes in the angle of view can be reduced when the object changes from infinity to the close end.

The image stabilization effect can be obtained by driving the entire lens unit or its part in a direction perpendicular to the optical axis direction. In particular, when the second lens unit L2, which is fixed during zooming, is set to the image stabilization lens unit, a moving amount of the image stabilization lens unit can be reduced and the miniaturization becomes easy.

The zoom lenses 1a to 1f according to respective examples may satisfy at least one of the following inequalities (1) to (12):

$$0.10 < TLt/ft < 0.80 \tag{1}$$

$$1.40 < ndL4\text{ave} < 1.70 \tag{2}$$

$$-0.30 < fL2/ft < -0.10 \tag{3}$$

$$0.15 < fL3/ft < 0.90 \tag{4}$$

$$0.30 < ML4/ML1 < 3.00 \tag{5}$$

$$-0.80 < fL2/fL1 < -0.20 \tag{6}$$

$$0.05 < fL4/ft < 0.50 \tag{7}$$

$$0.10 < fL4/fL1 < 0.70 \tag{8}$$

$$0.05 < fL4/fL3 < 1.00 \tag{9}$$

$$0.90 < SL4\text{ave} < 2.80 \tag{10}$$

$$55 < vdL1P\text{ave} < 99 \tag{11}$$

$$55 < vdL3P\text{ave} < 99 \tag{12}$$

The inequality (1) defines a condition regarding an overall optical length TLt (a distance from a surface closest to the object to the image plane IP) at the telephoto end and a focal length ft of the entire zoom lens at the telephoto end. By properly setting the condition, it becomes easy to miniaturize the zoom lens. If the value is lower than the lower limit in the inequality (1), the overall optical length at the telephoto end becomes too short relative to the focal length of the entire system at the telephoto end, the refractive power of each lens unit becomes strong, and it becomes difficult to suppress fluctuations of various aberrations associated with zooming. On the other hand, if the value is higher than the upper limit in the inequality (1), the overall optical length at the telephoto end becomes too large relative to the focal length of the entire zoom lens at the telephoto end, and the miniaturization becomes difficult.

The inequality (2) defines a conditions regarding an average of refractive index ndL4ave of lenses included in the fourth lens unit L4. Generally, the higher the refractive index of the lens material is, the higher the specific gravity of the lens material is. If the value is lower than the lower limit in the inequality (2), the curvature of the lens surface becomes stronger in order to obtain the required refractive power, and it is difficult to suppress fluctuations of various aberrations such as a spherical aberration and a curvature of field associated with zooming. On the other hand, if the value is higher than the upper limit in the inequality (2), the specific gravity of the lens becomes large and it becomes difficult to reduce the weight.

The inequality (3) defines a condition regarding the focal length ft of the entire zoom lens system at the telephoto end and a focal length fL2 of the second lens unit L2. If the value is lower than the lower limit in the inequality (3), the focal length fL2 becomes short, and it becomes difficult to suppress fluctuations of various aberrations such as a spherical aberration and a curvature of field associated with zooming. On the other hand, if the value is higher than the upper limit in the inequality (3), the focal length ft of the entire system at the telephoto end becomes short, and it becomes difficult to increase a magnification variation ratio.

The inequality (4) defines a condition regarding the focal length ft of the entire zoom lens at the telephoto end and a focal length fL3 of the third lens unit L3. If the value is lower than the lower limit in the inequality (4), the focal length fL3 becomes short, and it becomes difficult to suppress fluctuations of various aberrations such as a spherical aberration and a curvature of field associated with zooming. On the other hand, if the value is higher than the upper limit in the inequality (4), the focal length ft of the entire system at the telephoto end becomes short, and it becomes difficult to increase a magnification variation ratio.

The inequality (5) defines a condition regarding a moving amount ML1 (where a moving amount from the object side to the image side is set positive) of the first lens unit L1 from the object side to the image side and a moving amount ML4 (where a moving amount from the object side to the image side is set positive) of the fourth lens L4 from the object side to the image side during zooming from the wide-angle end to the telephoto end. If the value is lower than the lower limit in the inequality (5), the moving amount ML4 of the fourth lens unit L4 becomes small, and it becomes difficult to increase a magnification variation ratio. On the other hand, if the value is higher than the upper limit of the inequality (5), the moving amount ML4 of the fourth lens unit L4 becomes large and the miniaturization becomes difficult.

The inequality (6) defines a condition regarding a focal length fL1 of the first lens unit L1 and the focal length fL2 of the second lens unit L2. When the value is lower than the lower limit in the inequality (6), the focal length fL1 of the first lens unit L1 becomes longer, the moving amount of the first lens unit L1 during zooming from the wide-angle end to the telephoto end becomes large, and it is difficult to make small the zoom lens. On the other hand, if the value is higher than the upper limit in the inequality (6), the focal length fL1 of the first lens unit L becomes short, and it becomes difficult to correct the spherical aberration generated in the first lens unit L1.

The inequality (7) defines a condition regarding the focal length ft of the entire zoom lens at the telephoto end and a focal length fL4 of the fourth lens unit L4. If the value is lower than the lower limit in the inequality (7), the focal length fL4 becomes short, and it becomes difficult to suppress fluctuations of various aberrations such as a spherical aberration and a curvature of field associated with zooming. On the other hand, if the value is higher than the upper limit in the inequality (7), the focal length ft of the entire zoom lens at the telephoto end becomes short, and it becomes difficult to increase a magnification variation ratio.

The inequality (8) defines a condition regarding the focal length fL1 of the first lens unit L1 and the focal length fL4 of the fourth lens unit L4. If the value is lower than the lower limit in the inequality (8), the focal length fL4 becomes short, and it becomes difficult to suppress fluctuations of various aberrations such as a spherical aberration and a curvature of field associated with zooming. On the other hand, when the value is higher than the upper limit in the inequality (8), the focal length fL4 of the fourth lens unit L4 becomes longer, the refractive power of the fourth lens unit L4 becomes weaker, and a moving amount of the fourth lens unit L4 associated with zooming becomes large.

The inequality (9) defines a condition regarding the focal length fL3 of the third lens unit L3 and the focal length fL4 of the fourth lens unit L4. If the value is lower than the lower limit in the inequality (9), the focal length fL4 becomes short, and it becomes difficult to suppress fluctuations of various aberrations such as a spherical aberration and a curvature of field associated with zooming. On the other hand, when the value is higher than the upper limit in the inequality (9), the focal length fL4 of the fourth lens unit L4 becomes longer, the refractive power of the fourth lens unit L4 becomes weaker, and a moving amount of the fourth lens unit L4 due to zooming becomes large.

The inequality (10) defines a condition regarding an average specific density SL4ave of one or more lenses included in the fourth lens unit L4. Generally, as the specific gravity of the lens material increases, the refractive index of the lens material increases. If the value is lower than the lower limit in the inequality (10), the curvature of the lens surface becomes stronger in order to obtain a required refractive power, and it is difficult to suppress fluctuations of various aberrations such as a spherical aberration and a curvature of field associated with zooming. On the other hand, if the value is higher than the upper limit in the inequality (10), the specific gravity of the lens becomes large and the weight reduction becomes difficult.

The inequality (11) is a condition regarding an average value vdL1Pave of the Abbe number for the d-line of one or more positive lenses included in the first lens unit L1. If the value is lower than the lower limit in the inequality (11), it becomes difficult to correct the longitudinal chromatic aberration and the lateral chromatic aberration at the telephoto end. On the other hand, if the value is higher than the upper limit in the inequality (11), the dispersion of the positive lens becomes too small and it becomes difficult to correct the lateral chromatic aberration at the wide-angle end.

The inequality (12) is a condition regarding an average value vdL3Pave of the Abbe number for the d-line of one or more positive lenses included in the third lens unit L3. If the value is lower than the lower limit in the inequality (12), it becomes difficult to correct the longitudinal chromatic aberration at the telephoto end. On the other hand, if the value is higher than the upper limit in the inequality (12), the dispersion of the positive lens becomes too small and it becomes difficult to correct the longitudinal chromatic aberration at the wide-angle end.

In each example, the numerical ranges of the inequalities (1) to (12) may be replaced with ranges of the following inequalities (1a) to (12a):

$$0.40 < TLt/ft < 0.79 \tag{1a}$$

$$1.45 < ndL4\text{ave} < 1.67 \tag{2a}$$

$$-0.27 < fL2/ft < -0.12 \tag{3a}$$

$$0.20 < fL3/ft < 0.85 \tag{4a}$$

$$0.40 < ML4/ML1 < 2.50 \tag{5a}$$

$$-0.70 < fL2/fL1 < -0.23 \tag{6a}$$

$$0.07 < fL4/ft < 0.40 \tag{7a}$$

$$0.15 < fL4/fL1 < 0.60 \tag{8a}$$

$$0.10 < fL4/fL3 < 0.90 \tag{9a}$$

$$0.95 < SL4\text{ave} < 2.75 \tag{10a}$$

$$58 < vdL1P\text{ave} < 90 \tag{11a}$$

$$58 < vdL3P\text{ave} < 90 \tag{12a}$$

The numerical ranges of the inequalities (1) to (12) may be replaced with ranges of the following inequalities (1b) to (12b):

$$0.50 < TLt/ft < 0.78 \tag{1b}$$

$$1.50 < ndL4\text{ave} < 1.65 \tag{2b}$$

$$-0.25 < fL2/ft < -0.14 \tag{3b}$$

$$0.25 < fL3/ft < 0.80 \tag{4b}$$

$$0.50 < ML4/ML1 < 2.30 \tag{5b}$$

$$-0.60 < fL2/fL1 < -0.25 \tag{6b}$$

$$0.09 < fL4/ft < 0.30 \tag{7b}$$

$$0.20 < fL4/fL1 < 0.50 \tag{8b}$$

$$0.15 < fL4/fL3 < 0.80 \tag{9b}$$

$$1.00 < SL4\text{ave} < 2.70 \tag{10b}$$

$$60 < vdL1P\text{ave} < 85 \tag{11b}$$

$$60 < vdL3P\text{ave} < 85 \tag{12b}$$

A detailed description will now be given of the zoom lens according to each example.

The zoom lens 1a according to Example 1 includes a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power. The first lens unit L1 includes a lens (positive lens) L11, a lens (negative lens) L12, and a lens (positive lens) L13. The second lens unit L2 includes lenses L21 and L22. The third lens unit L3 includes a diaphragm SP and lenses L31 and L32. The fourth lens unit L4 includes lenses L41 and L42. The fifth lens unit L5 includes lenses L51 and L52. During zooming from the wide-angle end to the telephoto end, the first lens unit L1, the third lens unit L3, the fourth lens unit L4, and the fifth lens unit L5 move, and the second lens unit L2 does not move. At this time, a distance between the first lens unit L1 and the second lens unit L2 and a distance between the fourth lens unit L4 and the fifth lens unit L5 are widened, and a distance between the second lens unit L2 and the third lens unit L3 and a distance between the third lens unit L3 and the fourth lens unit L4 are narrowed, respectively. Both sides of the lens L42 of the fourth lens unit L4 are aspherical. The fifth lens unit L5 serves as a focus lens unit.

The zoom lens 1b according to Example 2 includes a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power. The first lens unit L1 includes lenses L11, L12, and L13. The second lens unit L2 includes lenses L21 and L22. The third lens unit L3 includes a diaphragm SP and lenses L31 and L32. The fourth lens unit L4 includes lenses L41 and L42. The fifth lens unit L5 includes lenses L51 and L52. During zooming from the wide-angle end to the telephoto end, the first lens unit L1, the third lens unit L3, the fourth lens unit L4, and the fifth lens unit L5 move, and the second lens unit L2 does not move. At this time, a distance between the first lens unit L and the second lens unit L2 and a distance between the fourth lens unit L4 and the fifth lens unit L5 are widened, and a distance between the second lens unit L2 and the third lens unit L3 and a distance between the third lens unit L3 and the fourth lens unit L4 are narrowed, respectively. Both sides of the lens L42 of the fourth lens unit L4 are aspherical. The fifth lens unit L5 serves as a focus lens unit.

The zoom lens 1c according to Example 3 includes a first lens unit L1 having a positive refractive power, a second lens unit L2 having a negative refractive power, a third lens unit L3 having a positive refractive power, a fourth lens unit L4 having a positive refractive power, a fifth lens unit L5 having a positive refractive power, and a sixth lens unit L6 having a negative refractive power. The first lens unit L1 includes lenses L11, L12, and L13. The second lens unit L2 includes L21 and L22. The third lens unit L3 includes a diaphragm SP and lenses L31 and L32. The fourth lens unit L4 includes lenses L41 and L42. The fifth lens unit L5 includes lenses L51 and L52. The sixth lens unit L6 includes lenses L61 and L62. During zooming from the wide-angle end to the telephoto end, the first lens unit L1, the third lens unit L3, the fourth lens unit L4, the fifth lens unit L5, and the sixth lens unit L6 move, and the second lens unit L2 does not move. During zooming, a distance between the first lens unit L1 and the second lens unit L2 and a distance between the fourth lens unit L4 and the fifth lens unit L5 are widened, respectively. During zooming, a distance between the second lens unit L2 and the third lens unit L3, a distance between the third lens unit L3 and the fourth lens unit L4, and a distance between the fifth lens unit L5 and the sixth lens unit L6 are narrowed, respectively. Both sides of the lens L42 of the fourth lens unit L4 are aspherical. Both sides of the lens L42 of the fourth lens unit L4 are aspherical. The sixth lens unit L6 serves as a focus lens unit.

The zoom lens 1d according to Example 4 includes a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, and a sixth lens unit L6 having a positive refractive power. The first lens unit L1 includes lenses L11, L12, and L13. The second lens unit L2 includes lenses L21 and L22. The third lens unit L3 includes a diaphragm SP and lenses L31 and L32. The fourth lens unit L4 includes lenses L41 and L42. The fifth lens unit L5 includes lenses L51 and L52. The sixth lens unit L6 includes a lens L61. During zooming from the wide-angle end to the telephoto end, the first lens unit L1, the third lens unit L3, the fourth lens unit L4, the fifth lens unit L5, and the sixth lens unit L6 move, and the second lens unit L2 does not move. During zooming, a distance between the first lens unit L1 and the second lens unit L2 and a distance between the fifth lens unit L5 and the sixth lens unit L6 are widened, respectively. During zooming, a distance between the second lens unit L2 and the third lens unit L3, a distance between the third lens unit L3 and the fourth lens unit L4, and a distance between the fourth lens unit L4 and the fifth lens unit L5 are narrowed, respectively. Both sides of the lens L42 of the fourth lens unit L4 are aspherical. The fifth lens unit L5 serves as a focus lens unit.

The zoom lens 1e according to Example 5 includes a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, and a sixth lens unit L6 having a negative refractive power. The first lens unit L1 includes lenses L11, L12, and L13. The second lens unit L2 includes lenses L21 and L22. The third lens unit L3 includes a diaphragm SP and lenses L31 and L32. The fourth lens unit L4 includes a lens L41. The fifth lens unit L5 includes lenses L51 and L52. The sixth lens unit L6 includes a lens L61. During zooming from the wide-angle end to the telephoto end, the first lens unit L1, the third lens unit L3, the fourth lens unit L4, the fifth lens unit L5, and the sixth lens unit L6 move, and the second lens unit L2 does not move. During zooming, a distance between the first lens unit L1 and the second lens unit L2 and a distance between the fifth lens unit L5 and the sixth lens unit L6 are widened, respectively. During zooming, a distance between the second lens unit L2 and the third lens unit L3, a distance between the third lens unit L3 and the fourth lens unit L4, and a distance between the fourth lens unit L4 and the fifth lens unit L5 are narrowed, respectively. Both sides of the lens L41 of the fourth lens unit L4 are aspherical. The fifth lens unit L5 serves as a focus lens unit.

The zoom lens 1f according to Example 6 includes a first lens unit L1, a second lens unit L2, a third lens unit L3, a fourth lens unit L4, and a fifth lens unit L5 having a negative refractive power, a sixth lens unit L6 having a refractive power, and a seventh lens unit L7 having a negative refractive power. The first lens unit L1 includes lenses L11, L12, and L13. The second lens unit L2 includes lenses L21 and L22. The third lens unit L3 includes a diaphragm SP and a lens L31. The fourth lens unit L4 includes lenses L41 and L42. The fifth lens unit L5 includes lenses L51 and L52. The sixth lens unit L6 includes a lens L61. The seventh lens unit L7 includes a lens L71. During zooming from the wide-angle end to the telephoto end, the first lens unit L1, the third lens unit L3, the fourth lens unit L4, the fifth lens unit L5, the sixth lens unit L6, and the seventh lens unit L7 move, and the two lens unit L2 does not move. During zooming, a distance between the first lens unit L1 and the second lens unit L2 and a distance between the fifth lens unit L5 and the sixth lens unit L6 are widened, respectively. During zooming, a distance between the second lens unit L2 and the third lens unit L3, a distance between the third lens unit L3 and the fourth lens unit L4, a distance between the fourth lens unit L4 and the fifth lens unit L5, and a distance between the 6th lens unit L6 and the seventh lens unit L7 are narrowed, respectively. Both sides of the lens L31 of the third lens unit L3 are aspherical. Both sides of the lens L42 of the fourth lens unit L4 are aspherical. The fifth lens unit L5 serves as a focus lens unit.

A description will be given of numerical examples 1 to 6 corresponding to Examples 1 to 6. In each numerical example, each surface of the optical system is assigned a surface number i (i is a natural number) from the object side. r is a radius of curvature (mm) of each surface, d is a lens thickness or distance (air spacing) (mm) on the optical axis between a surface with a surface number i and a surface with a surface number (i+1), and nd is a refractive index of a material of the optical element having each surface. vd is an Abbe number for the d-line of the material of the optical element having each surface. The Abbe number vd of a certain material is expressed as vd=(Nd−1)/(NF−NC), where Nd, NF, and NC are refractive indexes for the d-line (587.6 nm), the F-line (486.1 nm), and the C-line (656.3 nm) in the Fraunhofer lines.

The focal length (mm), F-number, and half angle of view (°) are values when the optical system is in focus on an object at infinity. The overall length of the lens is a length obtained by adding a backfocus BF to a distance on the optical axis from the frontmost surface (lens surface closest to the object) to the final surface (lens surface closest to the image plane) of the optical system. The backfocus BF is a distance from the final plane of the optical system to the image plane.

An asterisk "*" attached to the surface number means that the surface has an aspherical shape. In the aspherical shape, x is a displacement amount from a surface apex in the optical axis direction, h is a height from the optical axis in a direction orthogonal to the optical axis, a traveling direction of light is positive, and R is a paraxial radius of curvature, k is a conical constant, and A4, A6, A8, A10, and A12 are aspheric coefficients, and x is expressed by the following expression. The aspherical coefficient "e−x" means $10^{-x}$.

$$x=(h^2/R)/[1+\{1-(1+k)(h/R)^2\}^{1/2}+A4 \times h^4+A6 \times h^6+A8 \times h^8+A10 \times h^{10}+A12 \times h^{12}$$

Table 1 summarizes values corresponding to the inequalities (1) to (12) in the numerical examples 1 to 6.

Numerical Example 1

UNIT: mm
Surface Data

| Surface No. | r | d | nd | vd |
|---|---|---|---|---|
| 1 | 103.753 | 4.61 | 1.48749 | 70.2 |
| 2 | ∞ | 0.15 | | |
| 3 | 156.943 | 1.90 | 1.61340 | 44.3 |
| 4 | 53.406 | 5.96 | 1.49700 | 81.5 |
| 5 | 380.919 | (Variable) | | |
| 6 | −101.313 | 1.00 | 1.77250 | 49.6 |
| 7 | 28.984 | 2.85 | 2.05090 | 26.9 |
| 8 | 55.746 | (Variable) | | |

-continued

| Surface No. | r | d | nd | vd |
|---|---|---|---|---|
| 9 (Diaphragm) | ∞ | 0.60 | | |
| 10 | 29.396 | 5.49 | 1.48749 | 70.2 |
| 11 | −59.441 | 5.76 | | |
| 12 | −31.194 | 1.30 | 2.00100 | 29.1 |
| 13 | −75.081 | (Variable) | | |
| 14 | 415.256 | 3.50 | 1.48749 | 70.2 |
| 15 | −30.719 | 6.37 | | |
| 16* | 49.641 | 3.00 | 1.53110 | 55.9 |
| 17* | 47.793 | (Variable) | | |
| 18 | −992.387 | 2.22 | 1.84666 | 23.9 |
| 19 | −42.688 | 0.95 | 1.80400 | 46.5 |
| 20 | 39.970 | (Variable) | | |
| Image Plane | ∞ | | | |

Aspheric Data
16th Surface
$K=0.00000e+000$ $A4=-4.71184e-005$ $A6=-1.69647e-007$ $A8=6.47160e-010$
$A10=-6.68961e-012$ $A12=3.22858e-014$
17th Surface
$K=0.00000e+000$ $A4=-4.13756e-005$ $A6=-1.60763e-007$ $A8=6.71955e-010$
$A10=-4.98484e-012$ $A12=2.62649e-014$
Various Data

| ZOOM RATIO 3.87 | | | |
|---|---|---|---|
| | WIDE-ANGLE | MIDDLE | TELEPHOTO |
| Focal Length: | 100.31 | 200.00 | 388.00 |
| Fno: | 5.77 | 7.17 | 8.24 |
| Half Angle of View: | 12.17 | 6.17 | 3.19 |
| Image Height: | 21.64 | 21.64 | 21.64 |
| Overall Lens Length: | 182.61 | 225.42 | 258.53 |
| BF: | 48.26 | 75.67 | 110.31 |
| d5 | 16.89 | 59.69 | 92.80 |
| d8 | 41.71 | 26.23 | 3.60 |
| d13 | 11.14 | 6.27 | 4.09 |
| d17 | 18.95 | 11.89 | 2.07 |
| d20 | 48.26 | 75.67 | 110.31 |

Zoom Lens Unit Data

| Lens Unit | Starting Surface | Focal Length |
|---|---|---|
| 1 | 1 | 192.87 |
| 2 | 6 | −59.32 |
| 3 | 9 | 107.44 |
| 4 | 14 | 58.11 |
| 5 | 18 | −50.03 |

Numerical Example 2

UNIT: mm
Surface Data

| Surface No. | r | d | nd | vd |
|---|---|---|---|---|
| 1 | 125.719 | 4.61 | 1.48749 | 70.2 |
| 2 | ∞ | 0.15 | | |
| 3 | 206.094 | 1.90 | 1.61340 | 44.3 |
| 4 | 61.613 | 5.96 | 1.49700 | 81.5 |
| 5 | 3311.719 | (Variable) | | |
| 6 | −94.238 | 1.00 | 1.77250 | 49.6 |
| 7 | 29.812 | 2.85 | 2.05090 | 26.9 |
| 8 | 59.746 | (Variable) | | |

-continued

| Surface No. | r | d | nd | vd |
|---|---|---|---|---|
| 9 (Diaphragm) | ∞ | 0.60 | | |
| 10 | 33.800 | 5.49 | 1.48749 | 70.2 |
| 11 | −59.212 | 5.76 | | |
| 12 | −33.313 | 1.30 | 2.00100 | 29.1 |
| 13 | −79.764 | (Variable) | | |
| 14 | 669.192 | 3.50 | 1.59282 | 68.6 |
| 15 | −38.012 | 8.00 | | |
| 16* | 31.365 | 3.00 | 1.53110 | 55.9 |
| 17* | 27.194 | (Variable) | | |
| 18 | 190.513 | 2.22 | 1.95906 | 17.5 |
| 19 | −407.020 | 0.95 | 1.80400 | 46.5 |
| 20 | 42.702 | (Variable) | | |
| Image Plane | ∞ | | | |

Aspheric Data
16th Surface
$K=0.00000e+000$ $A4=-3.77585e-005$ $A6=-1.11836e-007$ $A8=2.47802e-010$
$A10=-1.60309e-012$ $A12=7.41207e-015$
17th Surface
$K=0.00000e+000$ $A4=-3.68964e-005$ $A6=-1.27560e-007$ $A8=4.90571e-010$
$A10=-3.52309e-012$ $A12=1.66624e-014$
Various Data

| ZOOM RATIO 3.50 | | | |
|---|---|---|---|
| | WIDE-ANGLE | MIDDLE | TELEPHOTO |
| Focal Length: | 100.00 | 187.74 | 350.00 |
| Fno: | 5.77 | 7.05 | 8.24 |
| Half Angle of View: | 12.21 | 6.57 | 3.54 |
| Image Height: | 21.64 | 21.64 | 21.64 |
| Overall Lens Length: | 191.90 | 234.71 | 267.82 |
| BF: | 53.88 | 82.89 | 117.84 |
| d5 | 16.89 | 59.69 | 92.80 |
| d8 | 41.71 | 26.23 | 3.60 |
| d13 | 11.14 | 6.27 | 4.09 |
| d17 | 21.00 | 12.34 | 2.19 |
| d20 | 53.88 | 82.89 | 117.84 |

Zoom Lens Unit Data

| Lens Unit | Starting Surface | Focal Length |
|---|---|---|
| 1 | 1 | 207.37 |
| 2 | 6 | −60.76 |
| 3 | 9 | 126.45 |
| 4 | 14 | 64.97 |
| 5 | 18 | −75.45 |

Numerical Example 3

UNIT: mm
Surface Data

| Surface No. | r | d | nd | vd |
|---|---|---|---|---|
| 1 | 72.901 | 5.00 | 1.48749 | 70.2 |
| 2 | −5116.308 | 0.15 | | |
| 3 | 96.485 | 1.90 | 1.80610 | 40.7 |
| 4 | 38.718 | 5.96 | 1.59410 | 60.5 |
| 5 | 151.108 | (Variable) | | |
| 6 | −138.145 | 1.00 | 1.75500 | 52.3 |
| 7 | 25.532 | 2.85 | 2.05090 | 26.9 |
| 8 | 44.316 | (Variable) | | |

-continued

| Surface No. | r | d | nd | vd |
|---|---|---|---|---|
| 9 (Diaphragm) | ∞ | 0.60 | | |
| 10 | 40.918 | 3.54 | 1.59410 | 60.5 |
| 11 | −110.268 | 5.49 | | |
| 12 | −40.305 | 1.30 | 2.00069 | 25.5 |
| 13 | −86.998 | (Variable) | | |
| 14 | −32.977 | 2.71 | 1.59410 | 60.5 |
| 15 | −19.917 | 0.36 | | |
| 16* | −28.313 | 2.50 | 1.68040 | 18.1 |
| 17* | −28.575 | (Variable) | | |
| 18 | 43.490 | 1.00 | 1.84666 | 73.8 |
| 19 | 34.968 | 2.47 | 1.49700 | 81.5 |
| 20 | 73.461 | (Variable) | | |
| 21 | 1108.890 | 3.10 | 1.92119 | 24.0 |
| 22 | −60.469 | 0.95 | 1.83481 | 42.7 |
| 23 | 47.468 | (Variable) | | |
| Image Plane | ∞ | | | |

Aspheric Data

16th Surface

K=0.00000e+000 A 4=−6.21812e−005 A 6=−6.99576e−008 A 8=−9.13103e−011

A10=−2.47166e−012 A12=1.49716e−014

17th Surface

K=0.00000e+000 A 4=−4.63866e−005 A 6=−2.29469e−008 A 8=−7.19123e−011

A10=−7.36741e−013 A12=5.69474e−015

Various Data

| ZOOM RATIO 4.29 | | | |
|---|---|---|---|
| | WIDE-ANGLE | MIDDLE | TELEPHOTO |
| Focal Length: | 70.00 | 149.64 | 300.00 |
| Fno: | 4.20 | 6.04 | 7.20 |
| Half Angle of View: | 17.17 | 8.23 | 4.12 |
| Image Height: | 21.64 | 21.64 | 21.64 |
| Overall Lens Length: | 170.19 | 199.65 | 232.45 |
| BF: | 23.56 | 62.47 | 105.22 |
| d5 | 4.56 | 34.02 | 66.82 |
| d8 | 41.56 | 24.34 | 5.16 |
| d13 | 19.67 | 11.78 | 3.01 |
| d17 | 1.00 | 4.23 | 7.82 |
| d20 | 38.95 | 21.92 | 3.52 |
| d23 | 23.56 | 62.47 | 105.22 |

Zoom Lens Unit Data

| Lens Unit | Starting Surface | Focal Length |
|---|---|---|
| 1 | 1 | 165.49 |
| 2 | 6 | −57.39 |
| 3 | 9 | 120.57 |
| 4 | 14 | 77.38 |
| 5 | 18 | 334.80 |
| 6 | 21 | −65.42 |

Numerical Example 4

UNIT: mm
Surface Data

| Surface No. | r | d | nd | vd |
|---|---|---|---|---|
| 1 | 137.194 | 3.32 | 1.48749 | 70.2 |
| 2 | 556.213 | 0.15 | | |
| 3 | 169.321 | 1.90 | 1.61340 | 44.3 |

-continued

| Surface No. | r | d | nd | vd |
|---|---|---|---|---|
| 4 | 59.780 | 7.39 | 1.49700 | 81.5 |
| 5 | −492.395 | (Variable) | | |
| 6 | −250.411 | 1.00 | 1.75500 | 52.3 |
| 7 | 25.858 | 2.85 | 2.05090 | 26.9 |
| 8 | 43.298 | (Variable) | | |
| 9 (Diaphragm) | ∞ | 0.60 | | |
| 10 | 31.879 | 4.94 | 1.49700 | 81.5 |
| 11 | 131.830 | 9.29 | | |
| 12 | −30.439 | 1.30 | 2.00069 | 25.5 |
| 13 | −43.792 | (Variable) | | |
| 14 | 35.880 | 4.30 | 1.49700 | 81.5 |
| 15 | −37.877 | 8.00 | | |
| 16* | −26.275 | 2.50 | 1.68040 | 18.1 |
| 17* | −29.773 | (Variable) | | |
| 18 | −176.955 | 2.56 | 2.00069 | 25.5 |
| 19 | −29.993 | 0.95 | 1.83481 | 42.7 |
| 20 | 32.008 | (Variable) | | |
| 21 | 44.117 | 4.00 | 1.48749 | 70.2 |
| 22 | 78.183 | (Variable) | | |
| Image Plane | ∞ | | | |

Aspheric Data

16th Surface

K=0.00000e+000 A 4=−5.75946e−005 A 6=5.33432e−008 A 8=7.02179e−010

A10=−4.69444e−012 A12=1.53060e−014

17th Surface

K=0.00000e+000 A4=−4.17692e−005 A 6=6.39652e−008 A 8=6.52144e−010

A10=−5.41304e−012 A12=1.71572e−014

Various Data

| ZOOM RATIO 3.50 | | | |
|---|---|---|---|
| | WIDE-ANGLE | MIDDLE | TELEPHOTO |
| Focal Length: | 100.01 | 181.05 | 350.01 |
| Fno: | 5.80 | 7.02 | 8.00 |
| Half Angle of View: | 12.21 | 6.81 | 3.54 |
| Image Height: | 21.64 | 21.64 | 21.64 |
| Overall Lens Length: | 199.48 | 233.16 | 270.66 |
| BF: | 48.68 | 44.50 | 39.84 |
| d5 | 20.44 | 54.13 | 91.63 |
| d8 | 36.85 | 20.92 | 3.19 |
| d13 | 17.18 | 11.36 | 4.88 |
| d17 | 11.26 | 8.69 | 1.00 |
| d20 | 10.00 | 38.50 | 75.05 |
| d22 | 48.68 | 44.50 | 39.84 |

Zoom Lens Unit Data

| Lens Unit | Starting Surface | Focal Length |
|---|---|---|
| 1 | 1 | 187.56 |
| 2 | 6 | −64.18 |
| 3 | 9 | 259.39 |
| 4 | 14 | 41.78 |
| 5 | 18 | −37.94 |
| 6 | 21 | 200.00 |

Numerical Example 5

UNIT: mm

Surface Data

| Surface No. | r | d | nd | vd |
|---|---|---|---|---|
| 1 | 81.922 | 6.75 | 1.59349 | 67.0 |
| 2 | 271.327 | 0.15 | | |
| 3 | 125.880 | 1.90 | 1.78885 | 48.6 |
| 4 | 55.716 | 8.50 | 1.43875 | 94.7 |
| 5 | 1162.628 | (Variable) | | |
| 6 | −677.896 | 1.00 | 1.80400 | 46.5 |
| 7 | 25.832 | 2.85 | 1.80610 | 33.3 |
| 8 | 100.072 | (Variable) | | |
| 9 (Diaphragm) | ∞ | 0.60 | | |
| 10 | 27.834 | 3.38 | 1.49700 | 81.5 |
| 11 | 164.466 | 3.11 | | |
| 12 | −115.909 | 1.30 | 2.05090 | 26.9 |
| 13 | 282.269 | (Variable) | | |
| 14* | 328.394 | 4.00 | 1.53110 | 55.9 |
| 15* | −36.741 | (Variable) | | |
| 16 | 475.166 | 2.17 | 1.64769 | 33.8 |
| 17 | −39.030 | 0.95 | 1.61800 | 63.4 |
| 18 | 36.189 | (Variable) | | |
| 19 | −66.132 | 1.50 | 1.49700 | 81.5 |
| 20 | −278.665 | (Variable) | | |
| Image Plane | ∞ | | | |

Aspheric Data

14th Surface

K=0.00000e+000 A 4=−1.26376e−005 A 6=−1.19115e−008 A 8=2.37456e−010

A10=−3.25470e−012 A12=1.12982e−014

15th Surface

K=0.00000e+000 A 4=−3.00508e−006 A 6=−9.30388e−009 A 8=2.40835e−010

A10=−3.30499e−012 A12=1.15799e−014

Various Data

| ZOOM RATIO 2.40 | | | |
|---|---|---|---|
| | WIDE-ANGLE | MIDDLE | TELEPHOTO |
| Focal Length: | 250.00 | 416.21 | 600.00 |
| Fno: | 7.63 | 9.80 | 11.33 |
| Half Angle of View: | 4.95 | 2.98 | 2.07 |
| Image Height: | 21.64 | 21.64 | 21.64 |
| Overall Lens Length: | 292.59 | 310.00 | 329.37 |
| BF: | 70.11 | 113.47 | 161.73 |
| d5 | 65.81 | 83.22 | 102.60 |
| d8 | 78.31 | 42.49 | 2.62 |
| d13 | 10.19 | 7.87 | 5.79 |
| d15 | 20.00 | 10.35 | 1.00 |
| d18 | 10.00 | 14.43 | 17.98 |
| d20 | 70.11 | 113.47 | 161.73 |

Zoom Lens Unit Data

| Lens Unit | Starting Surface | Focal Length |
|---|---|---|
| 1 | 1 | 206.90 |
| 2 | 6 | −108.94 |
| 3 | 9 | 303.78 |
| 4 | 14 | 62.46 |
| 5 | 16 | −67.10 |
| 6 | 19 | −174.88 |

Numerical Example 6

UNIT: mm

Surface Data

| Surface No. | r | d | nd | vd |
|---|---|---|---|---|
| 1 | 146.960 | 3.56 | 1.48749 | 70.2 |
| 2 | 2970.292 | 0.15 | | |
| 3 | 136.612 | 1.90 | 1.61340 | 44.3 |
| 4 | 57.926 | 5.80 | 1.49700 | 81.5 |
| 5 | 1014.952 | (Variable) | | |
| 6 | −98.695 | 1.00 | 1.80400 | 46.5 |
| 7 | 32.967 | 2.85 | 2.05090 | 26.9 |
| 8 | 83.134 | (Variable) | | |
| 9 (Diaphragm) | ∞ | 0.60 | | |
| 10* | 91.871 | 2.40 | 1.49710 | 81.6 |
| 11* | −108.954 | (Variable) | | |
| 12 | 87.448 | 3.76 | 1.49700 | 81.5 |
| 13 | −30.162 | 2.39 | | |
| 14* | −19.786 | 2.00 | 1.68040 | 18.1 |
| 15* | −26.414 | (Variable) | | |
| 16 | 12798.799 | 2.24 | 1.96300 | 24.1 |
| 17 | −49.891 | 0.95 | 1.83481 | 42.7 |
| 18 | 37.330 | (Variable) | | |
| 19 | 127.306 | 5.90 | 1.48749 | 70.2 |
| 20 | −50.154 | (Variable) | | |
| 21 | −52.612 | 1.50 | 1.43875 | 94.7 |
| 22 | 102.645 | (Variable) | | |
| Image Plane | ∞ | | | |

Aspheric Data

10th Surface

K=0.00000e+000 A 4=−1.82591e−005 A 6=−3.28414e−007 A 8=3.26981e−09

A10=−3.45786e−011 A12=7.88756e−014

11th Surface

K=0.00000e+000 A 4=−7.18371e−006 A 6=−3.69839e−007 A 8=4.13299e−009

A10=−4.11120e−011 A12=1.06406e−013

14th Surface

K=0.00000e+000 A 4=6.94676e−005 A 6=−3.36098e−007 A 8=4.13862e−009

A10=−3.50812e−011 A12=1.18904e−013

15th Surface

K=0.00000e+000 A 4=5.41469e−005 A 6=−2.50303e−007 A 8=2.53834e−009

A10=−2.06649e−011 A12=6.73250e−014

Various Data

| ZOOM RATIO 3.50 | | | |
|---|---|---|---|
| | WIDE-ANGLE | MIDDLE | TELEPHOTO |
| Focal Length: | 100.00 | 181.29 | 350.00 |
| Fno: | 5.80 | 7.00 | 8.00 |
| Half Angle of View: | 12.21 | 6.81 | 3.54 |
| Image Height: | 21.64 | 21.64 | 21.64 |
| Overall Lens Length: | 186.42 | 225.77 | 269.57 |
| BF: | 29.91 | 45.52 | 62.89 |
| d5 | 14.58 | 53.93 | 97.73 |
| d8 | 41.50 | 23.09 | 2.60 |
| d11 | 5.00 | 3.36 | 1.53 |
| d15 | 10.16 | 8.52 | 1.00 |
| d18 | 25.67 | 42.03 | 65.93 |
| d20 | 22.61 | 12.33 | 0.90 |
| d22 | 29.91 | 45.52 | 62.89 |

Zoom Lens Unit Data

| Lens Unit | Starting Surface | Focal Length |
|---|---|---|
| 1 | 1 | 193.74 |
| 2 | 6 | −75.01 |
| 3 | 9 | 100.67 |
| 4 | 12 | 70.51 |
| 5 | 16 | −50.80 |
| 6 | 19 | 74.62 |
| 7 | 21 | −79.05 |

TABLE 1

|  | Ex. 1 | Ex. 2 | Ex. 3 | Ex. 4 | Ex. 5 | Ex. 6 |
|---|---|---|---|---|---|---|
| fw | 100.31 | 100.00 | 70.00 | 100.01 | 250.00 | 100.00 |
| ft | 388.00 | 350.00 | 300.00 | 350.01 | 600.00 | 350.00 |
| fL1 | 192.87 | 207.37 | 165.49 | 187.56 | 206.90 | 193.74 |
| fL2 | −59.32 | −60.76 | −57.39 | −64.18 | −108.94 | −75.01 |
| fL3 | 107.44 | 126.45 | 120.57 | 259.39 | 303.78 | 100.67 |
| fL4 | 58.11 | 64.97 | 77.38 | 41.78 | 62.46 | 70.51 |
| TLt | 258.53 | 267.82 | 232.45 | 270.66 | 329.37 | 269.57 |
| ndL4ave | 1.509 | 1.562 | 1.637 | 1.589 | 1.531 | 1.589 |
| SL4ave | 1.74 | 2.57 | 2.67 | 2.44 | 1.01 | 2.44 |
| ML1 | −75.91 | −75.91 | −62.26 | −71.19 | −36.79 | −83.15 |
| ML4 | −45.16 | −45.16 | −53.05 | −45.95 | −80.59 | −42.37 |
| vdL1Pave | 75.89 | 75.89 | 65.35 | 75.89 | 80.83 | 75.89 |
| vdL3Pave | 70.23 | 70.23 | 60.47 | 81.54 | 81.54 | 81.54 |
| (1) | 0.67 | 0.77 | 0.77 | 0.77 | 0.55 | 0.77 |
| (2) | 1.509 | 1.562 | 1.637 | 1.589 | 1.531 | 1.589 |
| (3) | −0.153 | −0.174 | −0.191 | −0.183 | −0.182 | −0.214 |
| (4) | 0.277 | 0.361 | 0.402 | 0.741 | 0.506 | 0.288 |
| (5) | 0.59 | 0.59 | 0.85 | 0.65 | 2.19 | 0.51 |
| (6) | −0.31 | −0.29 | −0.35 | −0.34 | −0.53 | −0.39 |
| (7) | 0.15 | 0.19 | 0.26 | 0.12 | 0.10 | 0.20 |
| (8) | 0.30 | 0.31 | 0.47 | 0.22 | 0.30 | 0.36 |
| (9) | 0.54 | 0.51 | 0.64 | 0.16 | 0.21 | 0.70 |
| (10) | 1.74 | 2.57 | 2.67 | 2.44 | 1.01 | 2.44 |
| (11) | 75.89 | 75.89 | 65.35 | 75.89 | 80.83 | 75.89 |
| (12) | 70.23 | 70.23 | 60.47 | 81.54 | 81.54 | 81.54 |

Example 7

Figure 13:
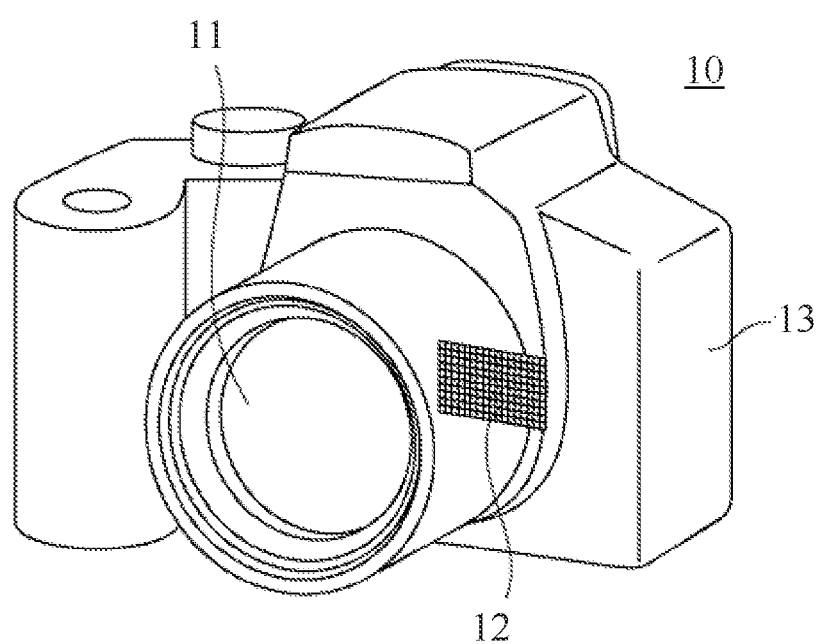
FIG. 13 is a schematic view of an image pickup apparatus according to Example 7.

Referring now to FIG. 13, a description will be given of an image pickup apparatus according to Example 7 of the present invention. FIG. 13 is a schematic view of an image pickup apparatus (digital still camera) 10 by using any of the zoom lenses 1a to 1f according to Examples 1 to 6 for an imaging optical system.

In FIG. 13, reference numeral 13 denotes a camera body, and reference numeral 11 denotes an imaging optical system (interchangeable lens) including any of the zoom lenses 1a to 1f according to Examples 1 to 6. Reference numeral 12 denotes an image sensor (photoelectric conversion element) such as a CCD sensor or a CMOS sensor, which is built in the camera body 13 and receives light from the imaging optical system 11 (optical image formed by the imaging optical system 11) and performs a photoelectric conversion. The camera body 13 may be a so-called single-lens reflex camera having a quick turn mirror, or a so-called mirrorless camera having no quick turn mirror.

By using the zoom lens according to any one according to Examples 1 to 6 for an image pickup apparatus such as a digital still camera, the image pickup apparatus having a small lens can be obtained. If any of the zoom lenses according to Examples 1 to 6 is mounted on an interchangeable lens (optical apparatus), a small interchangeable lens can be obtained.

Each example can provide a compact and lightweight zoom lens and an image pickup apparatus having high optical performance in the entire zoom range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-001396, filed on Jan. 7, 2021, which is hereby incorporated by reference herein in its entirety.

What is claimed is:

1. A zoom lens comprising, in order from an object side to an image side, a first lens unit with a positive refractive power, a second lens unit with a negative refractive power, a third lens unit with a positive refractive power, fourth lens unit with a positive refractive power, and a fifth lens unit with a negative refractive power, wherein during zooming from a wide-angle end to a telephoto end, the first lens unit moves, the second lens unit does not move along an optical axis, a distance between the first lens unit and the second lens unit is widened, a distance between the second lens unit and the third lens unit is narrowed, and a distance between the third lens unit and the fourth lens unit is narrowed, wherein the first lens unit includes a positive lens and a negative lens, wherein the second lens unit consists of two lenses or less, wherein the third lens unit consists of two lenses or less, wherein the fourth lens unit consists of two lenses or less, and wherein during image stabilization, the second lens unit moves to include a component of a direction perpendicular to the optical axis, wherein the following inequality is satisfied:

$$0.25 < fL3/ft < 0.90$$

where fL3 is a focal length of the third lens unit, and ft is a focal length at the telephoto end of the zoom lens.

2. The zoom lens according to claim 1, wherein the following inequality is satisfied:

$$0.10 < TLt/ft < 0.80$$

where TLt is an overall optical length of the zoom lens at the telephoto end.

3. The zoom lens according to claim 1, wherein the following inequality is satisfied:

$$1.40 < ndL4ave < 1.70$$

where ndL4ave is an average of refractive index of lenses included in the fourth lens unit.

4. The zoom lens according to claim 1, wherein the following inequality is satisfied:

$$-0.30 < fL2/ft < -0.10$$

where fL2 is a focal length of the second lens unit.

5. The zoom lens according to claim 1, wherein the following inequality is satisfied:

$$0.3 < ML4/ML1 < 3.0$$

where ML1 is a moving amount of the first lens unit and ML4 is a moving amount of the fourth lens unit during zooming from the wide-angle end to the telephoto end.

6. The zoom lens according to claim 1, wherein the following inequality is satisfied:

$$-0.80 < fL2/fL1 < -0.20$$

where fL1 is a focal length of the first lens unit, and fL2 is a focal length of the second lens unit.

7. The zoom lens according to claim 1, wherein the following inequality is satisfied:

$$0.05 < fL4/ft < 0.50$$

where fL4 is a focal length of the fourth lens unit.

8. The zoom lens according to claim 1, wherein the following inequality is satisfied:

$$0.10 < fL4/fL1 < 0.70$$

where fL1 is a focal length of the first lens unit, and fL4 is a focal length of the fourth lens unit.

9. The zoom lens according to claim 1, wherein the following inequality is satisfied:

$$0.05 < fL4/fL3 < 1.00$$

where fL3 is a focal length of the third lens unit, and fL4 is a focal length of the fourth lens unit.

10. The zoom lens according to claim 1, wherein the following inequality is satisfied:

$$0.90 < SL4ave < 2.80$$

where SL4ave is an average specific gravity of one or more lenses included in the fourth lens unit.

11. The zoom lens according to claim 1, wherein the following inequality is satisfied:

$$55 < vdL1Pave < 99$$

where vdL1Pave is an average value of an Abbe number for d-line of one or more positive lenses included in the first lens unit.

12. The zoom lens according to claim 1, wherein the following inequality is satisfied:

$$55 < vdL3Pave < 99$$

where vdL3Pave is an average value of an Abbe number for d-line of one or more positive lenses included in the third lens unit.

13. The zoom lens according to claim 1, wherein the second lens unit consists of two lenses that are a negative lens and a positive lens arranged in order from the object side to the image side.

14. The zoom lens according to claim 1, wherein the fourth lens unit includes a lens having at least one aspherical surface.

15. The zoom lens according to claim 1, further comprising:
a diaphragm; and
a focus lens unit located closer to an image plane than the diaphragm and configured to perform focusing from infinity to a close end.

16. The zoom lens according to claim 1, wherein the second lens unit consists of a positive lens A and a negative lens B, and the positive lens A and the negative lens are cemented.

17. The zoom lens according to claim 1, wherein the third lens unit includes a negative meniscus lens having a concave surface towards the object side.

18. The zoom lens according to claim 1, wherein the fourth lens unit includes a negative meniscus lens having a concave surface towards the object side.

19. The zoom lens according to claim 1, wherein a total number of lens units which are arranged in the zoom lens is five.

20. An image pickup apparatus comprising:
a zoom lens; and
an image sensor configured to receive an image formed by the zoom lens,
wherein the zoom lens includes, in order from an object side to an image side, a first lens unit with a positive refractive power, a second lens unit with a negative refractive power, a third lens unit with a positive refractive power, a fourth lens unit with a positive refractive power, and a fifth lens unit with a negative refractive power,
wherein during zooming from a wide-angle end to a telephoto end, the first lens unit moves, the second lens unit does not move along an optical axis, a distance between the first lens unit and the second lens unit is widened, a distance between the second lens unit and the third lens unit is narrowed, and a distance between the third lens unit and the fourth lens unit is narrowed,
wherein the first lens unit has a positive lens and a negative lens,
wherein the second lens unit consists of two lenses or less,
wherein the third lens unit consists of two lenses or less,
wherein the fourth lens unit consists of two lenses or less, and
wherein during image stabilization, the second lens unit moves to include a component of a direction perpendicular to the optical axis,
wherein the following inequality is satisfied:

$$0.25 < fL3/ft < 0.90$$

where fL3 is a focal length of the third lens unit, and ft is a focal length at the telephoto end of the zoom lens.

* * * * *